US011010201B2

(12) United States Patent
Taniguchi

(10) Patent No.: US 11,010,201 B2
(45) Date of Patent: May 18, 2021

(54) INFORMATION PROCESSING DEVICE, RESOURCE ALLOCATION SYSTEM, AND RESOURCE ALLOCATION METHOD

(71) Applicant: YOKOGAWA ELECTRIC CORPORATION, Tokyo (JP)

(72) Inventor: Koichi Taniguchi, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 222 days.

(21) Appl. No.: 16/464,093

(22) PCT Filed: Nov. 10, 2017

(86) PCT No.: PCT/JP2017/040551
§ 371 (c)(1),
(2) Date: May 24, 2019

(87) PCT Pub. No.: WO2018/101008
PCT Pub. Date: Jun. 7, 2018

(65) Prior Publication Data
US 2019/0294471 A1     Sep. 26, 2019

(30) Foreign Application Priority Data

Nov. 30, 2016  (JP) ................................ 2016-232861

(51) Int. Cl.
*G06F 9/50* (2006.01)
*H04L 9/00* (2006.01)
(Continued)

(52) U.S. Cl.
CPC ............... *G06F 9/505* (2013.01); *G06F 9/50* (2013.01); *G06F 9/5044* (2013.01); *G09C 1/00* (2013.01); *H04L 9/008* (2013.01); *H04L 9/16* (2013.01)

(58) Field of Classification Search
CPC ....................................................... G06F 9/505
See application file for complete search history.

(56) References Cited

U.S. PATENT DOCUMENTS 9,392,054 B1    7/2016  Biberman et al.
2005/0097560 A1*  5/2005  Rolia .................... G06F 9/5027
                                                      718/104
(Continued)

FOREIGN PATENT DOCUMENTS

JP        2011193106 A    9/2011

*Primary Examiner* — Charlie Sun
(74) *Attorney, Agent, or Firm* — Osha Bergman Watanabe & Burton LLP

(57) ABSTRACT

An information processing device includes: a storage that stores execution reservation information transmitted from a user server, wherein the execution reservation information represents an execution reservation of acceptor servers that execute first tasks that have been encrypted and divided; and a processor that: receives a second task from the user server, encrypts and divides the second task to generate the first tasks, requests the acceptor servers to execute the generated first tasks based on the execution reservation information stored in the storage, receives first execution results from the acceptor servers, decrypts and combines the first execution results to generate a second execution result, and transmits the generated second execution result to the user server.

20 Claims, 10 Drawing Sheets

(51) Int. Cl.
*H04L 9/16* (2006.01)
*G09C 1/00* (2006.01)

(56) References Cited

U.S. PATENT DOCUMENTS

| | | |
|---|---|---|
| 2013/0305256 A1 | 11/2013 | Dweck et al. |
| 2016/0021186 A1* | 1/2016 | de Sene ................ H04L 47/821 709/213 |

* cited by examiner

FIG. 3

```
                ACCEPTANCE APPLICATION SCREEN                    ⎯Scr1

· ACCEPTOR NAME        [ ○○ CORPORATION    ]
    · ACCEPTOR ID (ARBITRARY) [ round-corp       ]
    · IP ADDRESS           [ 000.111.222.333    ]
    · ACCEPTED PERIOD
            START          [ 2016/12/24 ]
            END            [ 2017/06/23 ]
    · PERFORMANCE
            CPU   MIPS VALUE        [      1000 ]
            RAM   TRANSFER RATE     [      1500 ] Mbps
            HDD   TRANSFER RATE     [       500 ] Mbps
    · ACCEPTED AMOUNT
            CPU   OCCUPATION RATE  [ 10 ] % ~ [  30 ] %
            RAM   CAPACITY         [ 100] GB ~ [ 300 ] GB
            HDD   CAPACITY         [   5] TB ~ [  20 ] TB

[ TRANSMIT ]  [ CANCEL ]
```

FIG. 4

```
                    USAGE APPLICATION SCREEN
                                                              ~Scr2

· USER NAME          □□ CORPORATION
    · USER ID (ARBITRARY)  square-inc

· DESIRED USAGE PERIOD

START        2017/01/15  9:00

END          2017/01/17 20:00

· DESIRED PERFORMANCE

CPU    MIPS VALUE            800   OR MORE

RAM    TRANSFER RATE        1000   Mbps
                                           OR MORE
        HDD    TRANSFER RATE         300   Mbps
                                           OR MORE
    · DESIRED USAGE AMOUNT

CPU    OCCUPATION RATE        20   % OR MORE

RAM    CAPACITY               50   GB OR MORE

HDD    CAPACITY                5   TB OR MORE

[ TRANSMIT ]   [ CANCEL ]
```

INFORMATION PROCESSING DEVICE, RESOURCE ALLOCATION SYSTEM, AND RESOURCE ALLOCATION METHOD

TECHNICAL FIELD

The present invention relates to an information processing device, a resource allocation system, and a resource allocation method.

BACKGROUND

Conventionally, analysis of big data has been carried out mainly by an information processing system which includes a super computer and many server devices installed in a data center owned by a major company. In such big data analysis, an enormous calculation amount that cannot be processed without maximizing the performance of the information processing system does not always occur generally, but it occurs temporarily in many cases. For this reason, the information processing system is not operating for a long time, or is operating in a state in which computing resources (for example, CPU (Central Processing Unit), memory usage rate, or the like) have available capacity. In this case, it is inefficient from a viewpoint of introduction cost and operation cost of the system.

Therefore, in order to utilize the system efficiently, for example, by using a cloud computing technology, a process is not concentrated on computing resources in one data center, but a process may be distributed to computing resources in a plurality of data centers connected to a communication network. For example, it is described in Patent Literature 1 that when a distributed processing system distributes and allocates a plurality of processes included in one service, pre-processes such as Web/AP (Web Application) are arranged in computing resources in many distributed sites connected to a network such as VPN (Virtual Private Network), and post-processes such as DB (Database) are distributed and arranged in computing resources in the data center.

PATENT LITERATURE

Patent Literature 1

Japanese Unexamined Patent Publication No. 2011-193106

However, in the conventional system such as the distributed processing system described in Patent Literature 1, for example, in a case where the data centers are owned by different companies, information such as data and programs used in analysis of big data will be disclosed to other companies (hereinafter, called as "acceptors") that accepts to use their computing resources. For this reason, conventionally, companies (hereinafter, called as "users") which analyze big data using the acceptors' computing resources are difficult to provide analysis information unless the acceptors are trustworthy.

SUMMARY

One or more embodiments of the present invention provide an information processing device, a resource allocation system, and a resource allocation method which can perform secure distributed computing by using acceptors' computing resources without disclosing analysis information to the acceptors.

An information processing device may include a storage device which stores execution reservation information transmitted from a user server, the execution reservation information representing an execution reservation of acceptor servers which are to execute first tasks which have been encrypted and divided, and a data processor configured to receive a second task from the user server, the data processor being configured to encrypt and divide the second task to generate the first tasks, the data processor being configured to request the acceptor servers to execute the generated first tasks based on the execution reservation information stored in the storage device, the data processor being configured to receive first execution results from the acceptor servers, the data processor being configured to decrypt and combine the first execution results to generate a second execution result, the data processor being configured to transmit the generated second execution result to the user server.

Further features and embodiments of the present invention will become apparent from the following detailed description with reference to the attached drawings.

One or more embodiments of the present invention provide an information processing device, a resource allocation system, and a resource allocation method which can perform secure distributed computing by using acceptors' computing resources without disclosing analysis information to the acceptors.

BRIEF DESCRIPTION OF DRAWINGS

FIG. 3 is a drawing illustrating an example of the acceptance application screen of the resource allocation system 1 according to one or more embodiments of the present invention.

FIG. 4 is a drawing illustrating an example of the usage application screen of the resource allocation system 1 according to one or more embodiments of the present invention.

DETAILED DESCRIPTION

Embodiments of the present invention will be now described herein. Those skilled in the art will recognize that many alternative embodiments can be accomplished using the teaching of the present invention and that the present invention is not limited to the embodiments illustrated herein for explanatory purposes.

One or more embodiments of the present invention provide an information processing device, a resource allocation system, and a resource allocation method which can perform a secure distributed computing by using acceptors' computing resources without disclosing analysis information to the acceptors.

Hereinafter, a resource allocation system in one or more embodiments of the present invention will be described with reference to drawings.

Figure 1:
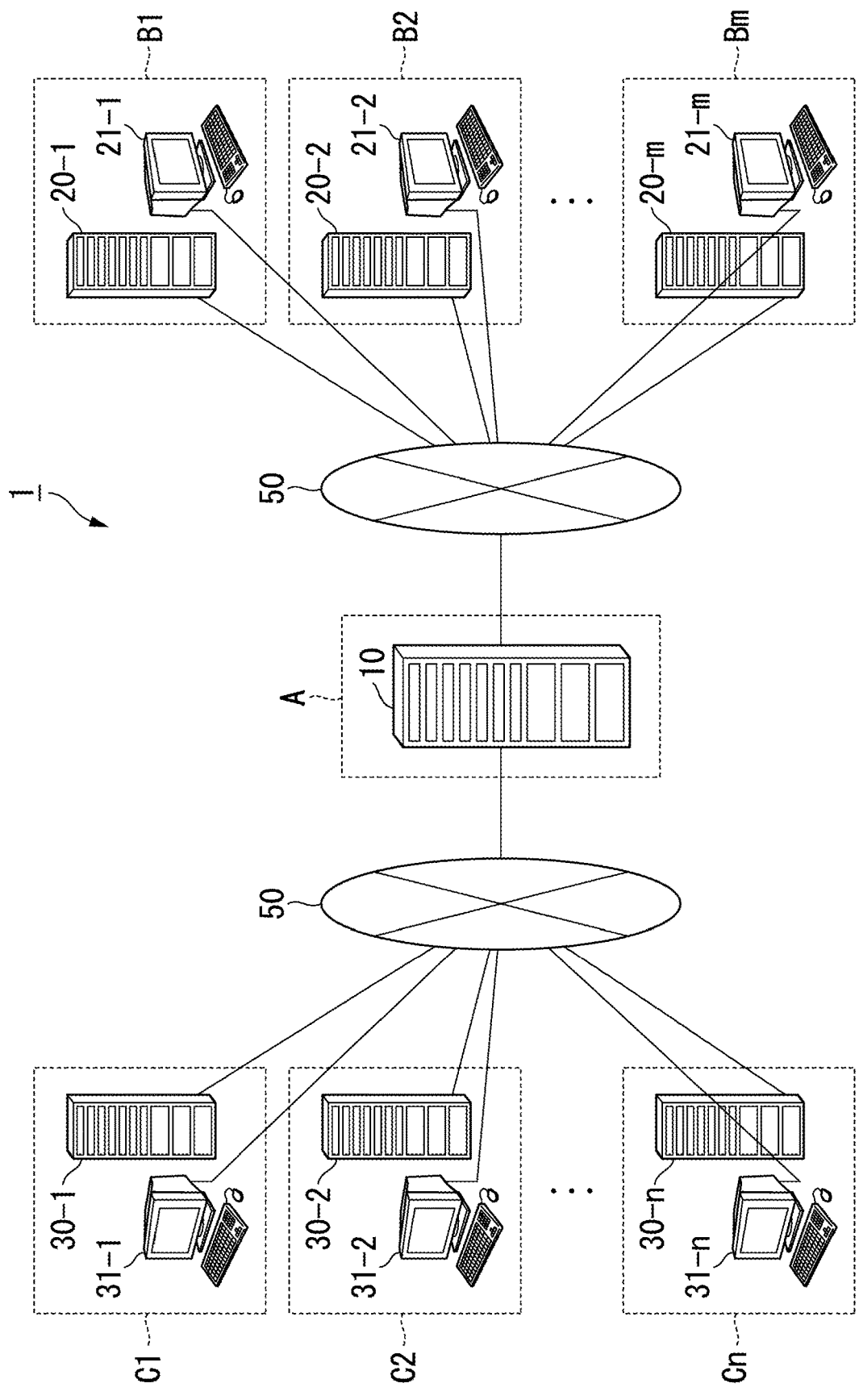
FIG. 1 is a schematic drawing illustrating an outline of a configuration of a resource allocation system 1 according to one or more embodiments of the present invention.

FIG. 1 is a schematic drawing illustrating an outline of a configuration of a resource allocation system 1 according to one or more embodiments of the present invention. As shown in the drawing, the resource allocation system 1 includes an information processing device 10, m acceptor servers (an acceptor server 20-1, an acceptor server 20-2, . . . , and an acceptor server 20-*m*), m acceptance application terminals (an acceptance application terminal 21-1, an acceptance application terminal 21-2, . . . , and an acceptance application terminal 21-*m*), n user servers (a user server 30-1, a user server 30-2, . . . , a user server 30-*n*), n usage application terminals (a usage application terminal 31-1, a usage application terminal 31-2, . . . , a usage application terminal 31-*n*), and a communication network 50.

In the following description, if it is unnecessary to distinguish the acceptor server 20-1, the acceptor server 20-2, . . . , and the acceptor server 20-*m*, they are called simply as "the acceptor server 20". Similarly, if it is unnecessary to distinguish the acceptance application terminal 21-1, the acceptance application terminal 21-2, . . . , and the acceptance application terminal 21-*m*, they are called simply as "the acceptance application terminal 21". Similarly, if it is unnecessary to distinguish the user server 30-1, the user server 30-2, . . . , and the user server 30-*n*, they are called simply as "the user server 30". Similarly, if it is unnecessary to distinguish the usage application terminal 31-1, the usage application terminal 31-2, . . . , and the usage application terminal 31-*n*, they are called simply as "the usage application terminal 31".

The information processing device 10 is a server device managed by a service provider A that provides a resource allocation service using the resource allocation system 1. The information processing device 10 includes a computer device, such as a large computer, a personal computer, or the like.

The acceptor server 20-1, the acceptor server 20-2, . . . , and the acceptor server 20-*m* are server devices managed respectively by an acceptor B1, an acceptor B2, . . . , and an acceptor Bm that provide computing resources of the acceptor server 20 via the resource allocation service. The acceptor server 20 includes a computer device, such as a large computer, a personal computer, or the like.

The computing resource is a calculation processing device such as a CPU, a storage medium such as a memory, or the like.

The acceptance application terminal 21-1, the acceptance application terminal 21-2, . . . , and the acceptance application terminal 21-*m* are terminal devices managed respectively by the acceptor B1, the acceptor B2, . . . , and the acceptor Bm. The acceptance application terminal 21 includes a computer device, such as a personal computer, a tablet type small terminal, or the like. The acceptor server 20 and the acceptance application terminal 21 may not be separate computer devices, and may be integrated as a single computer device.

The user server 30-1, the user server 30-2, . . . , and the user server 30-*n* are managed respectively by a user C1, a user C2, . . . , and a user Cn that use the computing resources of the acceptor server 20 via the resource allocation service. The user server 30 includes a computer device, such as a large computer, a personal computer, or the like.

The usage application terminal 31-1, the usage application terminal 31-2, . . . , and the usage application terminal 31-*n* are terminal devices managed respectively by the user C1, the user C2, . . . , and the user Cn. The usage application terminal 31 includes a computer device, such as a personal computer, a tablet type small terminal, or the like. The user server 30 and the usage application terminal 31 may not be separate computer devices, and may be integrated as a single computer device.

In the following description, if it is unnecessary to distinguish the acceptor B1, the acceptor B2, . . . , and the acceptor Bm, they are called simply as "the acceptor B". Similarly, if it is unnecessary to distinguish the user C1, the user C2, . . . , and the user Cn, they are called simply as "the user C".

The communication network 50 communicatively connects the information processing device 10, the acceptor server 20, the acceptance application terminal 21, the user server 30, and the usage application terminal 31. The communication network 50 includes a communication network such as the Internet. Communication performed via the communication network 50 may be wired communication, wireless communication, or a combination of the wired communication and the wireless communication.

The acceptor B inputs, by the acceptance application terminal 21, acceptance application information including information representing an accepted amount of computing resources which can be provided to the user C among the computing resources of the acceptor server 20. The acceptance application information is transmitted to the information processing device 10 via the communication network 50. The information processing device 10 adjusts and determines the accepted amount of the computing resources to be registered in the resource allocation service based on the acceptance application information obtained from the acceptance application terminal 21. The information processing device 10 stores acceptance registration information representing the determined accepted amount of the computing resources, and transmits the acceptance registration information to the acceptance application terminal 21.

The accepted amount is such as an occupation rate of CPU, a capacity of a memory, or the like.

When processing tasks stored in the user server 30, the user C inputs, by the usage application terminal 31, usage application information including information representing a usage amount of computing resources that the user wishes to use among the computing resources provided by the acceptor server 20. The use application information is transmitted to the information processing device 10 via the communication network 50. The information processing device 10 calculates and determines the usage amount of the required computing resources based on the usage application information obtained from the usage application terminal 31. The information processing device 10 stores usage registration information representing the determined usage amount of the computing resources.

The information processing device 10 allocates computing resources based on the acceptance registration information and the usage registration information which have been stored, and performs scheduling. The information processing device 10 transmits execution reservation information representing the allocated computing resources and the schedule to the acceptor server 20 and the user server 30.

The acceptor server 20 registers the obtained execution reservation information in an agent of its own acceptor server 20. As a result, in the acceptor server 20, the computing resources based on the execution reservation information become in a state for accepting an execution of processing the task entrusted from the designated user server 30 in accordance with the schedule based on the execution reservation information.

The user server 30 transmits the task to the information processing device 10 in accordance with the schedule based on the execution reservation information. The information processing device 10 encrypts the obtained task by using an encryption (for example, a fully homomorphic encryption, or a limited fully homomorphic encryption) which can be used for dividing a calculation amount while maintaining privacy and calculating each of them. The information processing device 10 divides the encrypted task into individual tasks based on the execution reservation information, and transmits the divided individual tasks to the acceptor servers 20 based on the execution reservation information.

For example, as a technology capable of dividing a calculation amount while maintaining privacy and calculating each of them, there is an "Enigma" using a limited fully homomorphic encryption, which is researched in MIT (Massachusetts Institute of Technology) media laboratory (refer to http://enigma.media.mit.edu/).

Each of the acceptor servers 20 which has obtained the individual task executes the individual task, and transmits individual execution result data which is execution result data of the individual task to the information processing device 10. When the information processing device 10 obtains all the individual execution result data, the information processing device 10 generates one encrypted execution result data by combining all the individual execution result data. The information processing device 10 decrypts the encrypted execution result data, and transmits the decrypted execution result data to the user server 30.

In one or more embodiments, the information processing device 10 executes the task encryption process, the task decryption process, the task division process, and the task combining process, but the present invention is not limited thereto. For example, a part or all of these processes may be executed by an external server (not shown). Alternatively, for example, these processes may be executed by the user server 30. In this case, the acceptor server 20 and the user server 30 can directly transmit and receive tasks, individual tasks, individual execution result data, and execution result data without passing through the information processing device 10.

Hereinafter, a functional configuration of each device of the resource allocation system 1 will be described with reference to drawings.

Figure 2:
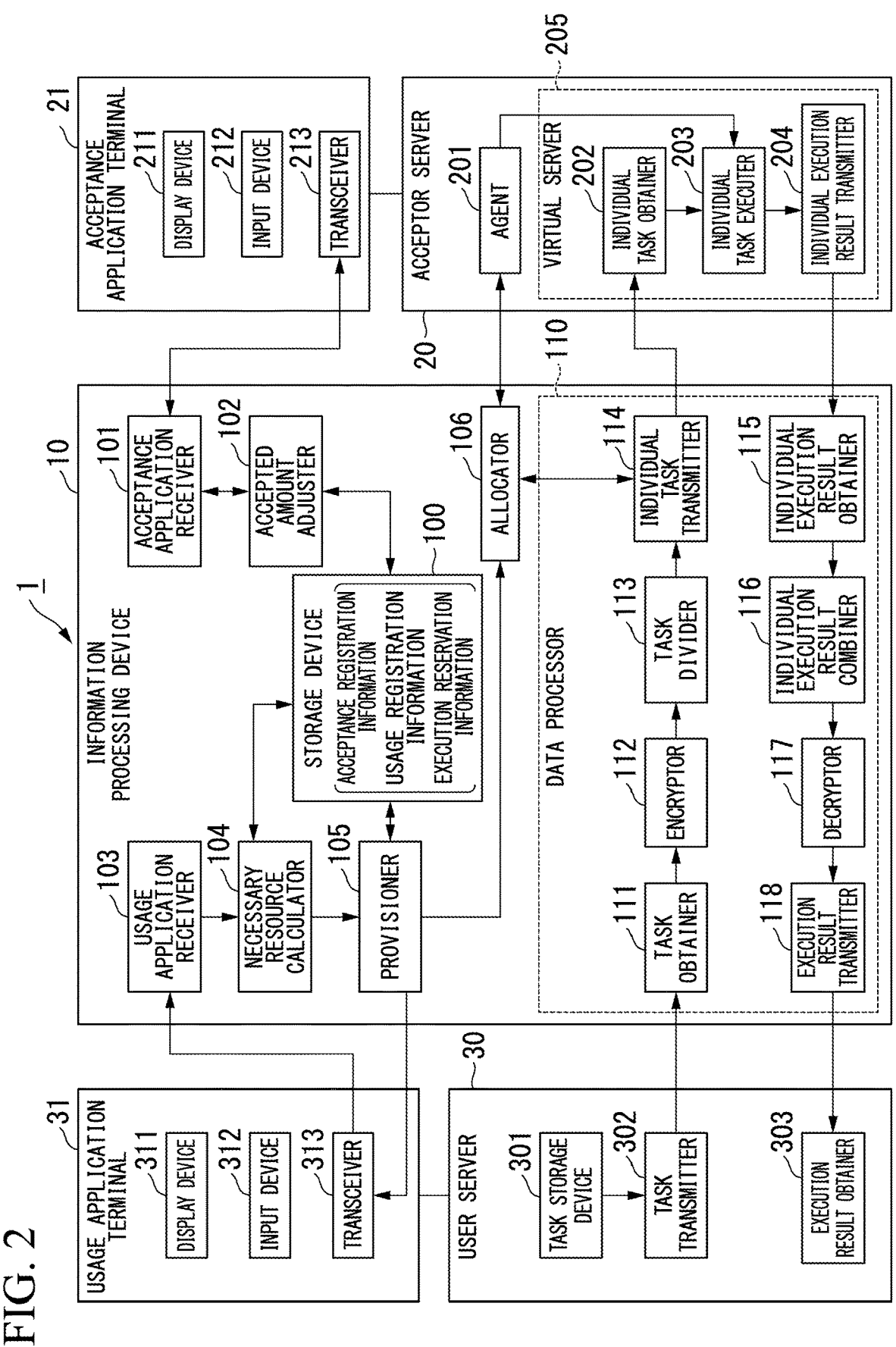
FIG. 2 is a block diagram illustrating a functional configuration of the resource allocation system 1 according to one or more embodiments of the present invention.

FIG. 2 is a block diagram illustrating a functional configuration of the resource allocation system 1 according to one or more embodiments of the present invention. As shown in the drawing, the resource allocation system 1 includes an information processing device 10, an acceptor server 20, an acceptance application terminal 21, a user server 30, and a usage application terminal 31.

In FIG. 2, only one acceptor server 20, only one acceptance application terminal 21, only one user server 30, and only one usage application terminal 31 are shown in order to explain simply, but a plurality of them may exist as shown in FIG. 1. In particular, only one acceptor server 20 may exist, but a plurality of acceptor servers 20 may also exist because distributed calculation processes of tasks cannot be performed if a plurality of acceptor servers 20 does not exist.

(Functional Configuration of Information Processing Device)

A functional configuration of the information processing device 10 will be described below. As shown in FIG. 2, the information processing device 10 includes a storage device 100, an acceptance application receiver 101, an accepted amount adjuster 102, a usage application receiver 103, a necessary resource calculator 104, a provisioner 105, an allocator 106, and a data processor 110. The data processor 110 includes a task obtainer 111, an encryptor 112, a task divider 113, an individual task transmitter 114, an individual execution result obtainer 115, an individual execution result combiner 116, a decryptor 117, and an execution result transmitter 118.

The storage device 100 stores the acceptance registration information (acceptance resource information) representing computing resources accepted by the acceptor servers 20 respectively, usage registration information representing a usage registration for executing tasks transmitted from the user server 30 by using the accepted computing resources, and the execution reservation information representing an execution reservation of the computing resources used for executing the individual tasks generated by dividing the task. In addition, the execution reservation information is transmitted from the user server 30, and is information representing an execution reservation of the acceptor servers 20 for executing the encrypted and divided tasks.

The storage device 100 may be a storage medium such as a HDD (Hard Disk Drive), a flash memory, an EEPROM (Electrically Erasable Programmable Read Only Memory), a RAM (Random Access read/write Memory), a ROM (Read Only Memory), or an arbitrary combination of these storage mediums.

The acceptance application receiver 101 receives, from the terminal 21 via the communication network 50, the acceptance application information including information representing the accepted amount of computing resources which can be provided to the user C among the computing resources of the acceptor server 20 managed by the acceptor B. The acceptance application receiver 101 accepts the acceptance application when receiving the acceptance application information, and outputs the acceptance application information to the accepted amount adjuster 102 which will be described later. The acceptance application receiver 101 is a communication interface for communicating via the communication network 50 with a transceiver 213 in the acceptance application terminal 21 which will be described later.

The accepted amount adjuster 102 adjusts and determines the accepted amount of computing resources to be registered in the resource allocation service based on the acceptance application information obtained from the acceptance application terminal 21. The accepted amount adjuster 102 stores, in the storage device 100, the acceptance registration information representing the determined accepted amount of computing resources (in other words, registers the acceptance registration information in the resource allocation service), and transmits the acceptance registration information to the acceptance application terminal 21 via the acceptance application receiver 101. As described above, the accepted amount is such as an occupation rate of CPU, a capacity of a memory, or the like.

For example, the accepted amount of computing resources to be registered in the resource allocation service is adjusted to be an accepted amount required for the service provider A to provide the resource allocation service based on the accepted amount of the computing resources provided by the acceptors B.

The acceptance registration information may be fixed information based on a contract concluded between the acceptor B and the service provider A at the time of initial acceptance registration, or may be periodically updated. Further, the acceptance registration information may be dynamic information which is registered in an agent (not shown) in the information processing device 10, and in which the accepted amount of computing resources is dynamically adjusted in accordance with an operation status of the acceptor server 20.

When the accepted amount adjuster 102 registers the acceptance registration information on all the acceptor servers 20 in the storage device 100 (in other words, registers the acceptance registration information in the resource allocation service), the computing resources are virtualized to function as one large computing resource for each of the computing resources. For example, the computing resources are virtualized so that the computing resources can function as one RAM having a large capacity in which capacities of RAMs provided by all the acceptor servers 20 are added.

When processing tasks stored in the user server 30 managed by the user C, the usage application receiver 103 receives, from the usage application terminal 31 via the communication network 50, the usage application information including information representing a usage amount of computing resources that the user C wishes to use among the computing resources provided by the acceptor server 20. The usage application receiver 103 accepts the usage application when receiving the usage application information, and outputs the usage application information to the necessary resource calculator 104 which will be described later. The usage application receiver 103 is a communication interface for communicating via the communication network 50 with a transceiver 313 in the usage application terminal 31 which will be described later.

The necessary resource calculator 104 calculates and determines necessary resources representing computing resources required for executing the task based on the usage application information. The necessary resource calculator 104 stores, in the storage device 100, the usage registration information representing the determined usage amount of computing resources (in other words, registers the usage registration information in the resource allocation service). The necessary resource calculator 104 outputs the usage registration information to the provisioner 105 which will be described later.

The provisioner 105 determines computing resources for executing each of the individual tasks based on the necessary resources, and generates execution reservation information based on the determined computing resources. The provisioner 105 stores, in the storage device 100, the execution reservation information representing the allocated computing resources and the schedule (in other words, registers the execution reservation information in the resource allocation service). The provisioner 105 transmits the execution reservation information to the acceptor server 20 via the allocator 106 which will be described later. Further, the provisioner 105 transmits the execution reservation information representing the allocated computing resources and the schedule via the communication network 50 to the transceiver 313 in the user server 30 which will be described later.

The allocator 106 controls each of the acceptor servers 20, which accept to use their computing resources based on the execution reservation information, to perform execution reservation (allocation) of individual tasks in the computing resources. Specifically, the allocator 106 transmits the execution reservation information to the acceptor server 20 via the communication network 50, and the allocator 106 controls an agent 201 of the acceptor server 20, which will be described later, to register the execution reservation information.

As a result, the agent 201 of the acceptor server 20 constructs a virtual server 205 in accordance with the schedule based on the execution reservation information by using the computing resources of its own acceptor server based on the execution reservation information registered before the scheduled process execution time.

As a result, the acceptor server 20 becomes a state for accepting the execution of tasks transmitted from the designated user server 30.

The data processor 110 receives a task (second task) from the user server 30, and encrypts and divides the task. Thereafter, the data processor 110 requests the acceptor servers 20 to execute the encrypted and divided task (first task) based on the execution reservation information stored in the storage device 100. Further, the data processor 110 receives execution results (first execution result) from the acceptor servers 20, and decrypts and combines the execution results. Thereafter, the data processor 110 transmits the decrypted and combined execution result (second execution result) to the user server 30.

The task obtainer 111 obtains a task via the communication network 50 from a task transmitter 302 of the user server 30, which will be described later. The task obtainer 111 outputs the obtained task to the encryptor 112 which will be described later. The task obtainer 111 is a communication interface for communicating via the communication network 50 with the task transmitter 302 in the user server 30.

The encryptor 112 encrypts the task by using an encryption method (for example, a fully homomorphic encryption, or a limited fully homomorphic encryption) in which the individual tasks, into which the encrypted task has been divided, can be calculated while maintaining the encrypted state. The encryptor 112 outputs the encrypted task to the task divider 113 which will be described later.

The task divider 113 divides the task encrypted by the encryptor 112 into a plurality of encrypted individual tasks based on the execution reservation information stored in the storage device 100. The task divider 113 outputs the divided individual tasks to the individual task transmitter 114 which will be described later.

The individual task transmitter 114 transmits the encrypted individual tasks via the communication network 50 to the virtual servers 205 constructed respectively in the acceptor servers 20 reserved for execution by the allocator 106 based on the execution reservation information stored in the storage device 100. The individual task transmitter 114 is a communication interface for communicating via the communication network 50 with the individual task obtainer 202 in the acceptor server 20.

The individual execution result obtainer 115 obtains, from the virtual servers 205 constructed in the acceptor servers 20 via the communication network 50, individual execution result data representing execution results of the encrypted individual tasks respectively executed by the computing resources accepted to be used by the acceptor servers 20. When the individual execution result obtainer 115 obtains the individual execution result data from the virtual servers 205 constructed in all the acceptor servers 20 to which the individual task transmitter 114 has transmitted the individual task, the individual execution result obtainer 115 outputs all the individual execution result data to the individual execution result combiner 116 which will be described later. The individual execution result obtainer 115 is a communication interface for communicating via the communication network 50 with individual execution result transmitters 204 in the virtual servers 205 constructed in the acceptor servers 20.

When the individual execution result combiner 116 obtains, from the individual execution result obtainer 115, all the individual execution result data respectively obtained from the virtual servers 205 constructed in the acceptor servers 20, the individual execution result combiner 116 generates one encrypted execution result data by combining all the individual execution result data. The individual execution result combiner 116 outputs, to the decryptor 117 which will be described later, the generated execution result data of which the task has been encrypted.

If the decryptor 117 has obtained, from the individual execution result combiner 116, the execution result data of which task has been encrypted, the decryptor 117 decrypts the encrypted execution result data of which task has been encrypted. The decryptor 117 outputs the decrypted execution result data to the execution result transmitter 118 which will be described later.

The execution result transmitter 118 transmits the execution result data decrypted by the decryptor 117 via the communication network 50 to an execution result obtainer 303 in the user server 30 of which task has been received by the task obtainer 111. The execution result transmitter 118 is a communication interface for communicating via the communication network 50 with the execution result obtainer 303 in the user server 30.

(Functional Configuration of Acceptor Server)

A functional configuration of the acceptor server 20 will be described below. As shown in FIG. 2, the acceptor server 20 includes an agent 201 and a virtual server 205 dynamically virtualized based on the execution reservation information. The virtual server 205 includes an individual task obtainer 202, an individual task executer 203, and an individual execution result transmitter 204.

The agent 201 performs an execution reserve of an individual task in computing resources and constructs the virtual server 205 based on the execution reservation information transmitted from the allocator 106 in the information processing device 10. In other words, in accordance with the schedule based on the execution reservation information, the agent 201 controls the computing resources of its own acceptor server based on the registered execution reservation information to accept an execution of the task transmitted from the specified user server 30.

The individual task obtainer 202 obtains the individual task transmitted from the individual task transmitter 114 in the information processing device 10 via the communication network 50, and the individual task obtainer 202 outputs the individual task to the individual task executer 203 which will be described later. The individual task obtainer 202 is a communication interface for communicating via the communication network 50 with the individual task transmitter 114 in the information processing device 10.

The individual task executer 203 executes the individual task obtained from the individual task obtainer 202 based on the execution reservation performed by the agent 201. The individual task executer 203 outputs the individual execution result data, which represents a result of executing the individual task, to the individual execution result transmitter 204 which will be described later.

The individual execution result transmitter 204 transmits the individual execution result data obtained from the individual task executer 203 to the individual execution result obtainer 115 in the information processing device 10 via the communication network 50. The individual execution result transmitter 204 is a communication interface for communicating via the communication network 50 with the individual execution result obtainer 115 in the information processing device 10.

(Functional Configuration of Acceptance Application Terminal)

A functional configuration of the acceptance application terminal 21 will be described below. As shown in FIG. 2, the acceptance application terminal 21 includes a display device 211, an input device 212, and a transceiver 213.

The display device 211 is an output interface for displaying various screens of the acceptance application terminal 21, such as an acceptance application screen. The display device 211 includes a display such as a liquid crystal display, an organic EL (Electroluminescence) display, or the like.

An example of the acceptance application screen will be described later.

The input device 212 is an input interface for generating an electric signal based on an operation input from a user. The input device 212 includes, for example, a keyboard, a mouse, and so on.

The display device 211 and the input device 212 may be integrated as a single device having both functions, such as a touch panel.

The transceiver 213 transmits acceptance application information, which has been generated by the input device 212 based on a user operation, to the acceptance application receiver 101 in the information processing device 10 via the communication network 50. The transceiver 213 obtains the acceptance registration information, which has been generated by the accepted amount adjuster 102 in the information processing device 10, from the acceptance application receiver 101 of the information processing device 10 via the communication network 50. The transceiver 213 is a communication interface for communicating via the communication network 50 with the acceptance application receiver 101 in the information processing device 10.

(Functional Configuration of User Server)

A functional configuration of the user server 30 will be described below. As shown in FIG. 2, the user server 30 includes a task storage device 301, a task transmitter 302, and an execution result obtainer 303.

The task storage device 301 stores a task to be executed by the acceptor server 20 in accordance with instructions of the resource allocation service, for example. The task storage device 301 may be a storage medium such as a hard disk drive (HDD), a flash memory, an EEPROM, a RAM (readable and writable memory), a ROM (Read Only Memory), or an arbitrary combination of these storage mediums.

The task transmitter 302 transmits the task stored in the task storage device 301 to the task obtainer 111 in the information processing device 10 via the communication network 50. The task transmitter 302 is a communication interface for communicating via the communication network 50 with the task obtainer 111 in the information processing device 10.

The task transmitter 302 may automatically transmit the task in accordance with the schedule based on the execution reservation information, or may transmit the task based on an operation input from the user in the usage application terminal 31.

The execution result obtainer 303 obtains, via the communication network 50, the execution result data representing an execution result of the task transmitted from the task transmitter 302, which has been transmitted from the execution result transmitter 118 in the information processing device 10. The execution result obtainer 303 is a communication interface for communicating via the communication network 50 with the execution result transmitter 118 in the information processing device 10.

(Functional Configuration of Usage Application Terminal)

A functional configuration of the usage application terminal 31 will be described below. As shown in FIG. 2, the usage application terminal 31 includes a display device 311, an input device 312, and a transceiver 313.

The display device 311 is an output interface for displaying various screens of the usage application terminal 31, such as a usage application screen. The display device 311 includes a display such as a liquid crystal display, an organic EL display, or the like.

An example of the usage application screen will be described later.

The input device 312 is an input interface for generating an electric signal based on an operation input from a user. The input device 212 includes, for example, a keyboard, a mouse, and so on.

The display device 311 and the input device 312 may be integrated as a single device having both functions, such as a touch panel.

The transceiver 313 transmits usage application information, which has been generated by the input device 312 based on a user operation, to the usage application receiver 103 in the information processing device 10 via the communication network 50. The transceiver 313 obtains the execution reservation information, which has been generated by the provisioner 105 in the information processing device 10, from the provisioner 105 in the information processing device 10 via the communication network 50. The transceiver 313 is a communication interface for communicating via the communication network 50 with the usage application receiver 103 and the provisioner 105 in the information processing device 10.

(Example of Acceptance Application Screen)

Hereinafter, an example of the acceptance application screen displayed on the display device 211 in the acceptance application terminal 21 will be described.

FIG. 3 is a drawing illustrating an example of the acceptance application screen of the resource allocation system 1 according to one or more embodiments of the present invention. As shown in the drawing, the acceptance application screen Scr1 is an input screen in which eleven input items of "acceptor name", "acceptor ID (arbitrary)", "IP address", "accepted period—start", "accepted period—end", "performance—CPU", "performance—RAM", "performance—HDD", "accepted amount—CPU", "accepted amount—RAM" and "accepted amount—HDD", and two buttons of a "transmit" button and a "cancel" button are displayed.

The "acceptor name" is an input item to which a name of the acceptor B is input.

The "acceptor ID (arbitrary)" is an input item to which an identifier for uniquely identifying the acceptor B is input. Input of the acceptor ID is arbitrary. If the acceptor B does not input the acceptor ID, the acceptor ID is automatically generated by the information processing device 10.

The "IP address" is an input item to which an IP (Internet Protocol) address of the acceptor server 20 is input.

The "accepted period—start" is an input item to which the acceptor B inputs a starting date of providing computing resources of the acceptor server 20.

The "accepted period—end" is an input item to which the acceptor B inputs an ending date of providing computing resources of the acceptor server 20.

The "performance—CPU" is an input item to which a MIPS (Million Instructions Per Second) value indicating a performance of the CPU provided by the acceptor server 20 of the acceptor B is input.

The "performance—RAM" is an input item to which a transfer rate indicating a performance of the RAM provided by the acceptor server 20 of the acceptor B is input.

The "performance—HDD" is an input item to which a transfer rate indicating a performance of the HDD provided by the acceptor server 20 by the acceptor B is input.

The "accepted amount—CPU" is an input item to which an occupation rate of the CPU indicating an accepted amount of the CPU provided by the acceptor server 20 of the acceptor B is input.

The "accepted amount—RAM" is an input item to which a capacity indicating an accepted amount of the RAM provided by the acceptor server 20 of the acceptor B is input.

The "accepted amount—HDD" is an input item to which a capacity indicating an accepted amount of the HDD provided by the acceptor server 20 of the acceptor B is input.

As shown in the drawing, an upper limit value and a lower limit value are input to the "accepted amount—CPU", the "accepted amount—RAM", and the "accepted amount—HDD", respectively. Specifically, a minimum accepted amount (fixed amount of the accepted amount) provided by the acceptor server 20 and a maximum accepted amount (variation amount of the accepted amount) which can be provided more than the fixed amount in accordance with an operation status of the acceptor server 20 are input thereto.

A part or all of these input items may be automatically determined based on some rule.

The "transmit" button is a button image for transmitting, to the information processing device 10, the acceptance application information based on the input to the input items.

The "cancel" button is a button image for closing the acceptance application screen without transmitting the acceptance application information to the information processing device 10.

(Example of Usage Application Screen)

Hereinafter, an example of the usage application screen displayed on the display device 311 in the usage application terminal 31 will be described.

FIG. 4 is a drawing illustrating an example of the usage application screen of the resource allocation system 1 according to one or more embodiments of the present invention. As shown in the drawing, the usage application screen Scr2 is an input screen in which ten input items of "user name", "user ID (arbitrary)", "desired usage period—start", "desired usage period—end", "desired performance—CPU", "desired performance—RAM", "desired performance—HDD", "desired usage amount—CPU", "desired usage amount—RAM", and "desired usage amount—HDD", and two buttons of a "transmit" button and a "cancel" button are displayed.

The "user name" is an input item to which a name of the user C is input.

The "user ID (arbitrary)" is an input item to which an identifier for uniquely identifying the user C is input. Input of the user ID is arbitrary. If the user C does not input the user ID, the user ID is automatically generated by the information processing device 10.

The "desired usage period—start" is an input item to which the user C inputs a desired starting date of using computing resources of the acceptor server 20.

The "desired usage period—end" is an input item to which the user C inputs a desired ending date of using computing resources of the acceptor server 20.

The "desired performance—CPU" is an input item to which a MIPS value desired by the user C and indicating a performance of the CPU provided by the acceptor server 20 is input.

The "desired performance—RAM" is an input item to which a transfer rate desired by the user C and indicating a performance of the RAM provided by the acceptor server 20 is input.

The "desired performance—HDD" is an input item to which a transfer rate desired by the user C and indicating a performance of the HDD provided by the acceptor server 20 is input.

The "desired usage amount—CPU" is an input item to which an occupation rate of the CPU desired by the user C and indicating a usage amount of the CPU provided by the acceptor server 20 is input.

The "desired usage amount—RAM" is an input item to which a capacity desired by the user C and indicating a usage amount of the RAM provided by the acceptor server 20 is input.

The "desired usage amount—HDD" is an input item to which a capacity desired by the user C and indicating a usage amount of the HDD provided by the acceptor server 20 is input.

A part or all of these input items may be automatically determined based on some rule.

The "transmit" button is a button image for transmitting, to the information processing device 10, the use application information based on the input to the input items.

The "cancel" button is a button image for closing the usage application screen without transmitting the usage application information to the information processing device 10.

The acceptor B who provides computing resources to be used by the user C may be limited, and an input item to which information for limiting the acceptor B is input may be displayed on the acceptance application screen. For example, the input item to which information for limiting the acceptor B may be an input item for inputting "acceptor name" or "acceptor ID" of the acceptor B who accepts to provide computing resources, or an input item for inputting "acceptor name" or "acceptor ID" of the acceptor B who does not want to accept to provide the computing resources.

(Operation of Information Processing Device when Receiving Acceptance Application)

Hereinafter, an operation of the information processing device 10 when receiving an acceptance application will be described.

Figure 5:
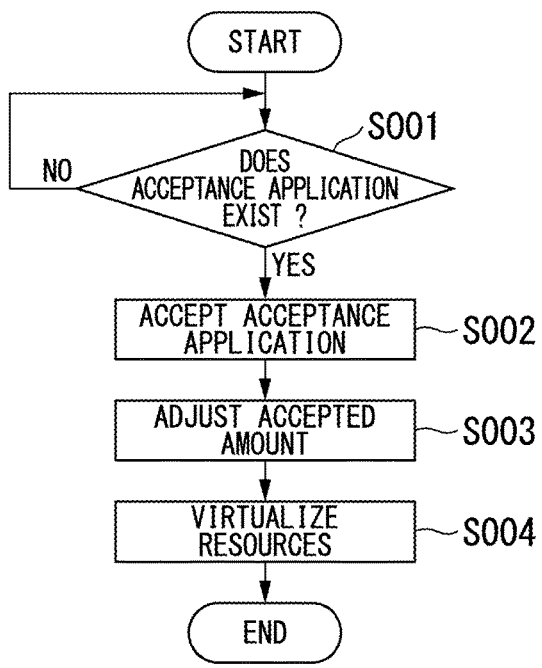
FIG. 5 is a flowchart illustrating an operation of the information processing device 10 when receiving a resource acceptance application in the resource allocation system 1 according to one or more embodiments of the present invention.

FIG. 5 is a flowchart illustrating an operation of the information processing device 10 when receiving a resource acceptance application in the resource allocation system 1 according to one or more embodiments of the present invention. This flowchart is started when the acceptance application information generated by the input device 212 in the acceptance application terminal 21 based on a user operation of the acceptor B is transmitted from the transceiver 213 in the acceptance application terminal 21 to the acceptance application receiver 101 in the information processing device 10 via the communication network 50.

(Step S001) If the acceptance application receiver 101 in the information processing device 10 has obtained the acceptance application information transmitted from the acceptance application terminal 21 via the communication network 50, the process proceeds to step S002. Otherwise, the process remains at step S001. The acceptance application information includes information representing the accepted amount of computing resources which the acceptor B can provide to the user C among the computing resources of the acceptor server 20 managed by the acceptor B.

(Step S002) The acceptance application receiver 101 in the information processing device 10 accepts the acceptance application when receiving the acceptance application information, and outputs the acceptance application information to the accepted amount adjuster 102. Thereafter, the process proceeds to step S003.

(Step S003) The accepted amount adjuster 102 in the information processing device 10 adjusts and determines the accepted amount of computing resources to be registered in the resource allocation service based on the acceptance application information obtained from the acceptance application receiver 101. For example, if the information processing device 10 has already secured a sufficient accepted amount for the CPU, but the information processing device 10 has not secured a sufficient accepted amount for the RAM, the information processing device 10 adjusts the accepted amounts by determining that the accepted amount of the RAM is the accepted amount based on the acceptance application information, and by determining that the accepted amount of the CPU is a part of the accepted amount based on the acceptance application information.

The accepted amount adjuster 102 stores, in the storage device 100, the acceptance registration information representing the determined accepted amount of computing resources (in other words, registers the acceptance registration information in the resource allocation service), and transmits the acceptance registration information to the acceptance application terminal 21 via the acceptance application receiver 101.

(Step S004) When the accepted amount adjuster 102 in the information processing device 10 registers the acceptance registration information on all the acceptor servers 20 in the storage device 100 (in other words, registers the acceptance registration information in the resource allocation service), the computing resources are virtualized to function as one large computing resource for each of the computing resources.

Thereafter, the process of this flowchart ends.

(Operation of Information Processing Device when Receiving Usage Application)

An operation of the information processing device 10 when receiving the usage application will be described below.

Figure 6:
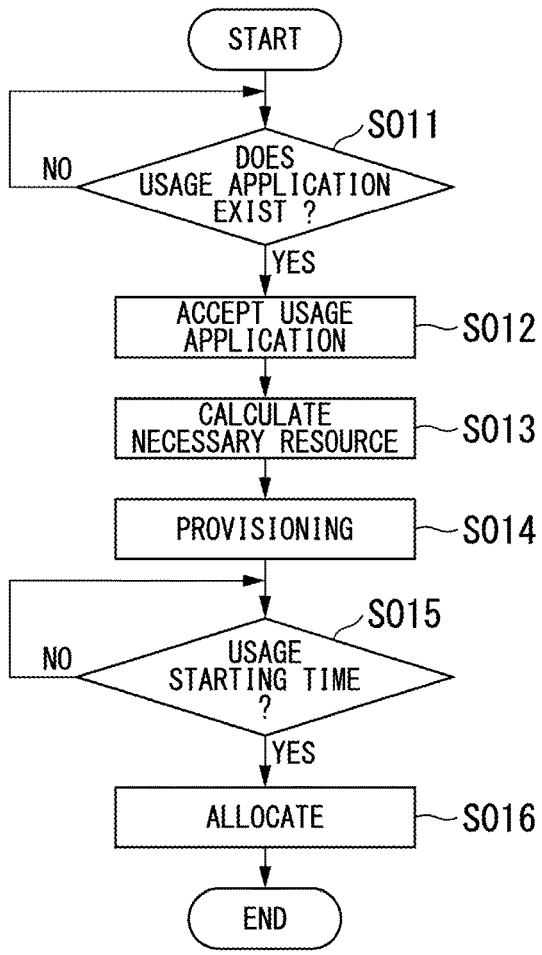
FIG. 6 is a flowchart illustrating an operation of the information processing device 10 when receiving a resource usage application in the resource allocation system 1 according to one or more embodiments of the present invention.

FIG. 6 is a flowchart illustrating an operation of the information processing device 10 when receiving a resource usage application in the resource allocation system 1 according to one or more embodiments of the present invention. This flowchart is started when the usage application information generated by the input device 312 in the application terminal 31 based on a user operation of the user C is transmitted from the transceiver 313 in the usage application terminal 31 to the usage application receiver 103 in the information processing device 10.

(Step S011) If the usage application receiver 103 in the information processing device 10 has obtained the usage application information transmitted from the application terminal 31 via the communication network 50, the process proceeds to step S012. Otherwise, the process remains at step S011. The usage application information includes information representing a usage amount of computing resources which the user C desires to use among the computing resources provided by the acceptor server 20 when processing the task stored in the user server 30 managed by the user C.

(Step S012) The usage application receiver 103 in the information processing device 10 accepts the usage application when receiving the usage application information, and outputs the usage application information to the necessary resource calculator 104. Thereafter, the process proceeds to step S013.

(Step S013) The necessary resource calculator 104 in the information processing device 10 calculates and determines necessary resources representing computing resources required for executing the task based on the usage application information. The necessary resource calculator 104 stores, in the storage device 100, the usage registration information representing the determined usage amount of computing resources (in other words, registers the usage registration information in the resource allocation service). The necessary resource calculator 104 outputs the usage registration information to the provisioner 105 which will be described later. Thereafter, the process proceeds to step S014.

(Step S014) The provisioner 105 in the information processing device 10 determines computing resources for executing each of the individual tasks based on the necessary resources, and generates execution reservation information based on the determined computing resources. The provisioner 105 stores, in the storage device 100, the execution reservation information representing the allocated computing resources and the schedule. The provisioner 105 outputs the execution reservation information to the allocator 106 prior to the scheduled execution time of the individual tasks based on the execution reservation information. The provisioner 105 transmits the execution reservation information via the communication network 50 to the transceiver 313 in the user server 30. Thereafter, the process proceeds to step S015.

(Step S015) If the allocator 106 in the information processing device 10 has detected that the execution scheduled time has been reached based on the execution reservation information, the process proceeds to step S016. Otherwise, the process remains at step S015.

(Step S016) The allocator 106 of the information processing device 10 controls each of the acceptor servers 20, which accepts to use their computing resources based on the execution reservation information obtained from the provisioner 105 in step S014, to perform execution reservation (allocation) of individual tasks in the computing resources. Specifically, the allocator 106 transmits the execution reservation information to the acceptor server 20 via the communication network 50, and the allocator 106 controls the agent 201 of the acceptor server 20 to register the execution reservation information. As a result, the agent 201 in the acceptor server 20 controls the computing resources of its own the acceptor server based on the registered execution reservation information to become a state for accepting the execution of tasks transmitted from the designated user server 30 in accordance with the schedule based on the execution reservation information.

Thereafter, the process of this flowchart ends.

(Operation of Information Processing Device when Executing a Task)

Hereinafter, an operation of the information processing device 10 when executing a task will be described.

Figure 7:
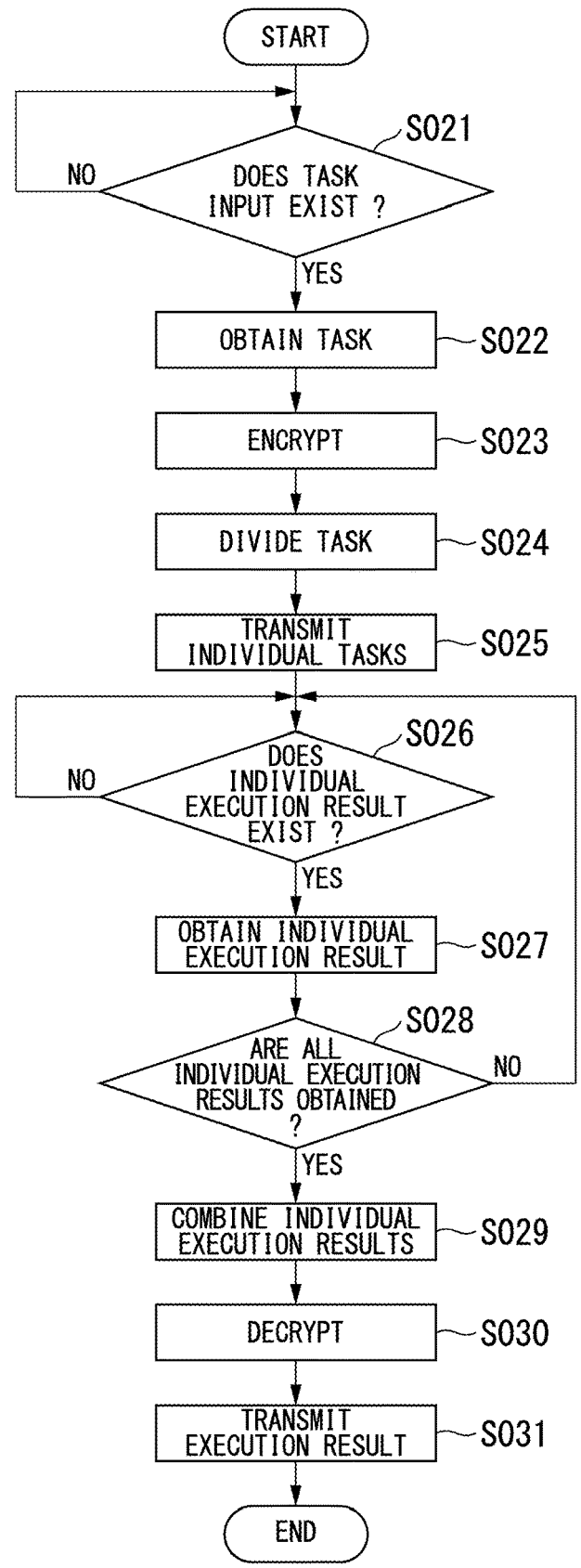
FIG. 7 is a flowchart illustrating an operation of the information processing device 10 when executing a task in the resource allocation system 1 according to one or more embodiments of the present invention.

FIG. 7 is a flowchart illustrating an operation of the information processing device 10 when executing a task in the resource allocation system 1 according to one or more embodiments of the present invention. This flowchart is started when one of tasks stored in the task storage device 301 in the user server 30 is transmitted from the task transmitter 302 to the task obtainer 111 in the information processing device 10 via the communication network 50.

(Step S021) If the task transmitted from the task transmitter 302 in the usage application terminal 31 has been input to the task obtainer 111 in the information processing device 10 via the communication network 50, the process proceeds to step S022. Otherwise, the process remains at step S021.

(Step S022) The task obtainer 111 in the information processing device 10 obtains the task, and outputs the obtained task to the encryptor 112. Thereafter, the process proceeds to step S203.

(Step S023) The encryptor 112 in the information processing device 10 encrypts the task obtained from the task obtainer 111 by using an encryption (for example, a fully homomorphic encryption, or a limited fully homomorphic encryption) which can be used for dividing a calculation amount while maintaining privacy and calculating each of them. The encryptor 112 outputs the encrypted task to the task divider 113. Thereafter, the process proceeds to step S024.

(Step S024) The task divider 113 in the information processing device 10 divides the encrypted task obtained from the encryptor 112 into a plurality of encrypted individual tasks based on the execution reservation information stored in the storage device 100. The task divider 113 outputs the divided individual tasks to the individual task transmitter 114. Thereafter, the process proceeds to step S025.

(Step S025) The individual task transmitter 114 in the information processing device 10 transmits the encrypted individual tasks via the communication network 50 to the acceptor servers 20 reserved for execution by the allocator 106 based on the execution reservation information stored in the storage device 100. Thereafter, the process proceeds to step S026.

(Step S026) If the individual execution result data representing execution results of the encrypted individual tasks respectively executed by the computing resources accepted to be used by the acceptor servers 20 has input to the individual execution result obtainer 115 in the information processing device 10 via the communication network 50, the process proceeds to step S027. Otherwise, the process remains at step S026.

(Step S027) The individual execution result obtainer 115 in the information processing device 10 obtains the individual execution result data from the acceptor server 20 of which individual task transmitter 114 has transmitted the individual task. Thereafter, the process proceeds to step S028.

(Step S028) If the individual execution result obtainer 115 in the information processing device 10 has obtained all the individual execution result data from all the acceptor servers 20 of which individual task transmitter 114 has transmitted the individual tasks, the individual execution result obtainer 115 outputs all the individual execution result to the individual execution result combiner 116, and the process proceeds to step S029. Otherwise (if the individual execution result obtainer 115 has not obtained all the individual execution result data), the process returns to step S026.

(Step S029) If the individual execution result combiner 116 in the information processing device 10 has obtained, from the individual execution result obtainer 115, all the individual execution result data received from the acceptor servers 20, the individual execution result combiner 116 generates one encrypted execution result data by combining all the individual execution result data. The individual execution result combiner 116 outputs, to the decryptor 117, the generated execution result data of which the task has been encrypted. Thereafter, the process proceeds to step S030.

(Step S030) If the decryptor 117 in the information processing device 10 has obtained, from the individual execution result combiner 116, the execution result data of which task has been encrypted, the decryptor 117 decrypts the execution result data of which task has been encrypted. The decryptor 117 outputs the decrypted execution result data to the execution result transmitter 118. Thereafter, the process proceeds to step S031.

(Step S031) The execution result transmitter 118 in the information processing device 10 transmits the execution result data decrypted by the decryptor 117 via the communication network 50 to the execution result obtainer 303 in the user server 30 of which task has been received by the task obtainer 111.

Thereafter, the process of this flowchart ends.

(Application to Cloud Computing Environment)

The resource allocation system 1 in one or more embodiments of the present invention may be realized in a cloud computing environment A1 as described below. The resource allocation system 1 is realized in an intelligence node A11 of the cloud computing environment A1 described below, but the present invention is not limited thereto. The resource allocation system 1 may be realized in a socialization node A10 of the cloud computing environment A1.

Hereinafter, an example of a cloud computing environment for realizing the resource allocation system 1 according to one or more embodiments of the present invention will be described with reference to drawings.

Figure 8:
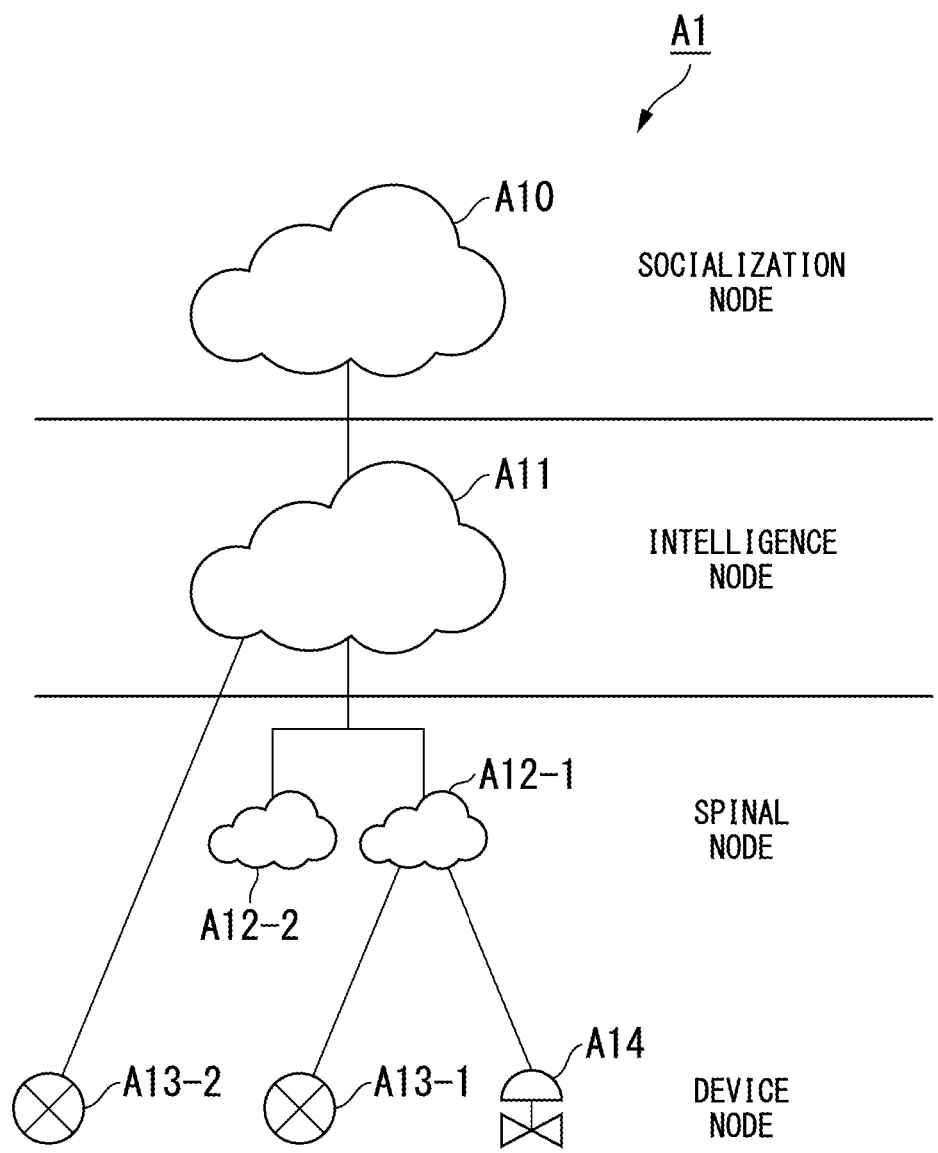
FIG. 8 is a schematic drawing illustrating an outline of the configuration of the cloud computing environment including the resource allocation system 1 according to one or more embodiments of the present invention.

FIG. 8 is a schematic drawing illustrating an outline of the configuration of the cloud computing environment including the resource allocation system 1 according to one or more embodiments of the present invention. As shown in the drawing, the cloud computing environment A1 is a system which includes four hierarchies of a device node, a spinal node, an intelligence node, and a socialization node.

The device node includes various sensors, various devices, and various systems. The various sensors are, for example, a temperature/humidity sensor, a pressure sensor, a flow rate sensor, or the like. The various devices are, for example, a PLC (programmable logic controller) which is a control device, an OBD (On-Board Diagnostics) connected to a CAN-BUS (Controller Area Network-BUS) device in a vehicle, a KPI (Key Performance Indicator) monitor, a display for displaying a current value of a specific sensor, a lamp, a buzzer, a valve, a robot arm, or the like. Various systems are, for example, a DCS (Distributed Control System), a drone control system, an intrusion detection system, a security system to which an entry badge reader is connected, a building automation system to which a light, a door lock, an elevator, and a sprinkler are connected, or the like.

In the cloud computing environment A1 shown in FIG. 8, the hierarchy of the device node includes a device node A13-1 and a device node A13-2 which are sensors, and includes a device node A14 which is an actuator. Hereinafter, if it is unnecessary to distinguish the device node A13-1, the device node A13-2, and the device node A14, they are called generically as device nodes A13-14.

In order to simplify the explanation, the device nodes A13-14 of the cloud computing environment A1 in one or more embodiments includes two sensors and one actuator, but the present invention is not limited thereto. The device nodes A13-14 may include one or more sensors, actuators, systems, and so on. Generally, in many cases, a lot of sensors, actuators, and systems are accommodated with respect to one spinal node.

Sensors, actuators, and systems of the device nodes A13-14 include a device which transmits data, a device which receives and displays data, a device which receives data and takes an action, and so on. For example, the sensors, the actuators, and the systems are compatible with plug-and-play. Further, for example, the sensors, the actuators, and the systems have a function for communicating simultaneously with a plurality of applications.

For example, the device nodes A13-14 includes a device which communicates with a device included in the spinal node and a device which communicates with a device included in the intelligence node.

For example, a device node A13-14 communicatively connected to a device included in the spinal node is a device which requires a real-time property, a device used by an application which is not permitted to delay (delay of data communication) and fluctuate (fluctuation of data communication speed), a device which may tighten a communication bandwidth when it is connected directly to the intelligence node to generate a large amount of data, or the like.

On the other hand, for example, a device node A13-14 communicatively connected to a device included in the intelligence node is a device used by an application which is not affected by delay and fluctuation, and a device which is installed in a remote place and required to communicate via a wireless communication network such as a mobile phone network or a satellite line, a device to be moved, or the like.

The device node A13-1 and the device node A14 are connected to a device included in the spinal node via Internet through a network interface, such as Ethernet (registered trademark), and a plurality of routers and switches. Further, the device node A13-2 is connected to a device included in the intelligence node via Internet through a network interface, such as Ethernet (registered trademark), and a plurality of routers and switches.

The device nodes A13-14 communicate with a device included in the spinal node or a device included in the intelligence node in accordance with Internet Protocol (IP).

The spinal node includes a server device, and functions as a gateway. In the cloud computing environment A1 shown in FIG. 8, the hierarchy of the spiral node includes a spinal node A12-1 and a spinal node A12-2. Hereinafter, if it is unnecessary to distinguish the spinal node A12-1 and the spinal node A12-2, they are called generically as a spinal node A12.

A server device included in the spinal node A12 (hereinafter, called simply as a spinal node A12) is a server device which accommodates (in other words, logically connects, manages, or performs input/output of data) at least one device node A13-14 in the cloud computing environment. The spinal node A12-2 also accommodates at least one device node A13-14 like the spinal node A12-1, but the description is omitted in FIG. 8 in order to simplify the explanation.

Generally, the spinal node A12 is a device called as a gateway server, a fog computer, an edge computer, or the like, for example. The spinal node A12 is installed between a server device (a socialization node A10 and an intelligence node A11 in one or more embodiments) in the cloud computing environment and sensors, actuators, and systems included in the device nodes A13-14.

For example, the spinal node A12 receives data from a device node A13-14 which communicates in accordance with a communication protocol which cannot be used by the intelligence node A11 for communicating. The spinal node A12 transmits the received data to the intelligence node A11 in accordance with a communication protocol which can be used by the intelligence node A11 for communicating. As a result, the spiral node A12 transfers data from the device nodes A13-14 to the intelligence node A11. For example, the spinal node A12 receives a signal transmitted from an analog sensor, which cannot communicate in accordance with the Internet protocol, in accordance with a communication protocol other than the Internet protocol. The spinal node A12 converts the received signal into a digital signal, and normalizes the digital signal. Thereafter, the spinal node A12 transmits the normalized signal to a server device included in the intelligence node A11 (hereinafter, called simply as an intelligence node A11) in accordance with the Internet protocol. As a result, the spiral node A12 transfers data from the device nodes A13-14 to the intelligence node A11.

For example, the spinal node A12 receives data transmitted from the device nodes A13-14, performs processes such as calculation, interpretation, and determination to the received data, and transmits the processed result to the intelligence node A11.

For example, the spinal node A12 obtains data from the device nodes A13-14, performs pre-processes to the data, adds a time stamp (symbol indicating an occurrence time) to generate time series data, obtains a logic and an algorithm for processing the time series data from the intelligence node A11, and executes a process (processing and determination) to the time series data based on the logic and the algorithm.

For example, the spinal node A12 transmits the time series data to the intelligence node A11 as necessary or based on instructions from the intelligence node A11. The spinal node A12 transmits, to the appropriate device node A13-14, the time series data and a control signal representing an action generated based on the logic and the algorithm.

The spinal node A12 temporarily stores the time series data in a time series database (not shown) provided in the spinal node A12. At the same time, the spinal node A12 transmits the time series data to the intelligence node A11 in response to a request from the intelligence node A11. Further, the spinal node A12 transmits the time series data, which has been temporarily stored in the time series database, asynchronously in order from the oldest data through the communication path of which security is secured for historian (not shown). Since the historian is directly connected to the intelligence node A11, the intelligence node A11 can read and use the historian as if the historian exists in a local environment.

In a case where the spinal node A12 is constituted by a single hardware, in preparation for a failure or abnormal operation in the spinal node A12, the device nodes A13-14 communicatively connected to the spinal node A12 may transmit data to two or more spinal nodes A12 in parallel. If the device node A13-14 is a device which communicates in accordance with the Internet protocol, the device node A13-14 may transmit data and control signals to the communication network using a technology such as multicasting or broadcasting, and two or more spinal nodes A12 may receive the data and the control signal in parallel in order to perform redundancy.

The socialization node A10 and the intelligence node A11 include a server device and a network device which provide a cloud computing environment. The socialization node A10 and the intelligence node A11 may be physically separated by separate devices, or may be logically separated in a single device.

A device included in the socialization node A10 (hereinafter, called simply as the socialization node A10) provides functions for sharing an application development environment and an application execution environment between companies (hereinafter, called to as tenants) which develop an application together, between a company which provides an application and a client which uses the application, and between a company and a person.

A device included in the intelligence node A11 provides functions for sharing an application development environment and an application execution environment between organizations (hereinafter, called as sites) such as departments or groups which develop applications in a company together, and between employees (hereinafter, called as accounts).

Hereinafter, the application development environment and the application execution environment of one or more embodiments of the present invention will be called generally as a Co-innovation space. The Co-innovation space is configured by the socialization node A10 and the intelligence node A11, and can be used between companies, between a company and a person, and between persons in a company.

The socialization node A10 and the intelligence node A11 operate in a server device as described above, and the Co-innovation space is implemented in the socialization node A10 and the intelligence node A11. The intelligence node A11 has a main function of the Co-innovation space. On the other hand, among the functions of the Co-innovation space, the socialization node A10 has functions required for sharing and trading an application program and for communicating between companies or between a company and a person.

The intelligence node A11 manages the spinal nodes A12 and the device nodes A13-14 which are communicatively connected to the intelligence node A11. A user accesses to the intelligence node A11 through a human machine interface (HMI) (not shown) and uses the Co-innovation space.

The intelligence node A11 has various external interfaces for collaborating with various external systems. For example, the intelligence node A11 collaborates with an external IoT (Internet of Things), an external IIoT (Industrial Internet of Things) cloud computing environment, an external charging system, an external database system, and so on. In this way, since the intelligence node A11 can collaborate widely with various external systems, the intelligence node A11 can construct the Co-innovation space collaborating widely with various external systems and applications on the Co-innovation space in various IoT cloud computing environments.

Since the intelligence node A11 has various external interfaces for collaborating with various external systems, the intelligence node A11 can utilize the interfaces provided by the IoT and IIoT cloud computing environments. Therefore, it is possible to deal with an entire supply chain of business processes in customer companies and an entire life cycle.

The Co-innovation space is a virtual space in a cloud computing environment, and is a space for application co-creation which is separated by a company (tenant) unit, an organization (site) unit, or the like, and separated safely from each other.

By using architectures of the Co-innovation space, for example, it is possible to develop applications for performing consultation using big data, various control, asset management, remote sensing, remote monitoring, and KAIZEN (improvement) activity support, and it is possible to develop systems such as MES (Manufacturing Execution System) and DCS.

Instead of being implemented in a cloud computing environment, the Co-innovation space may be implemented in a server device in a data center of a local environment.

The architecture of the Co-innovation space may be provided by one or more devices included in the intelligence node A11 and the socialization node A10. A storage area in the architecture of the Co-innovation space may be storage in one or more devices included in the intelligence node A11 and the socialization node A10, or may be configured by combining parts of storage area of storage in a plurality of devices.

(Functional Configuration of Co-Innovation Space)

A functional configuration of the Co-innovation space will be described below.

Figure 9:
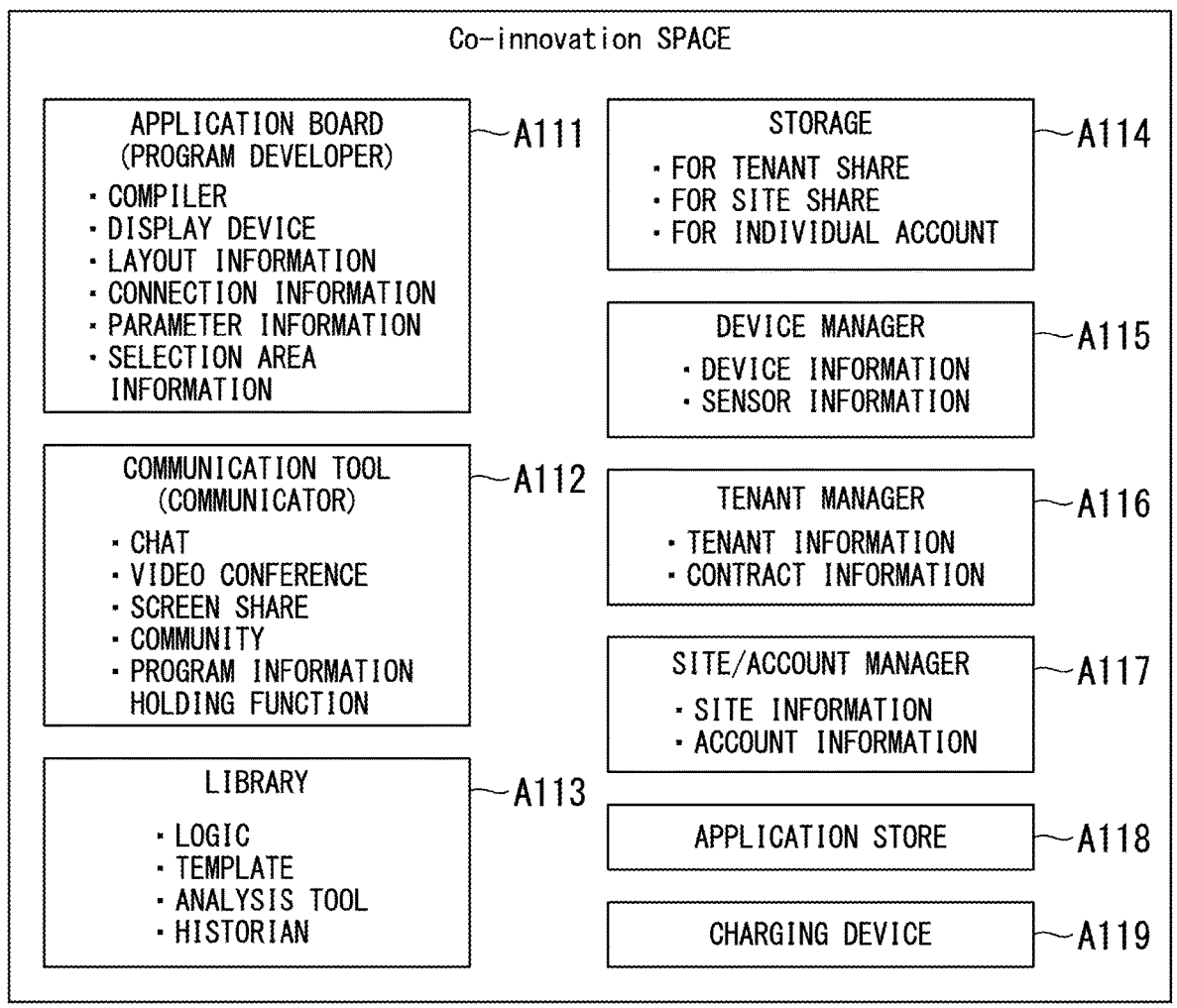
FIG. 9 is a schematic block diagram illustrating a functional configuration of the Co-innovation space in the cloud computing environment including the resource allocation system 1 according to one or more embodiments of the present invention.

FIG. 9 is a schematic block diagram illustrating a functional configuration of the Co-innovation space in the cloud computing environment including the resource allocation system 1 according to one or more embodiments of the present invention. As shown in the drawing, the intelligence node A11 includes an application board A111, a communication tool A112, a library A113, a storage A114, a device manager A115, a tenant manager A116, a site/account manager A117, an application store A118, and a charging device A119.

The application board A111 (a program developer, a program development display) provides a user with an application development environment and an application execution environment of multi-tenant, multi-site, and multi-account. The application board A111 has functions such as a compiler and a display device capable of visually displaying an application program to the user. The display device displays an image representing the Co-innovation space, and visually displays the application program in the Co-innovation space based on layout information, connection information, parameter information, selection area information, and so on.

The layout information is information representing a form of processes of the application program to be developed. For example, the layout information includes information representing that the application program to be developed is an application for performing a process of multi-input and two-output, or an application for performing a process of multi-input and multiple-output, or an application for performing a process of one-input and multiple-output, or the like.

The connection information is information on connection lines defined when generating a diagram which visually shows data items and relations between logics by connecting input data items, logics as process contents, and output data items as process results by the connection lines.

The parameter information is information representing setting values of various parameters set in the application program to be developed.

The selection area information is information representing a part of processes selected (designated) by a user operation among a series of processes of the application program to be developed. For example, with respect to an application program visually displayed by the application board A111, the user surrounds a part of the area of the application program by operating a mouse in order to generate the selection area information representing the surrounded area.

A user having an account associated with a tenant or a site can create, manage, and execute the application program by using a screen (hereinafter, called as Co-innovation space screen) displayed by the display device of the application board A111 while sharing data, logics, and applications with other users based on an access authority and an execution authority set in advance or set by an administrator.

When developing an application program, the user selects a necessary development part from a list of various development parts (for example, data items of input data, logics as processing contents, and data items as process result data) in the application board A111. Thereafter, the user drags and drops the selected development part to an application design area by mouse operation. Thereby, the selected development part is displayed in the application design area. The user performs a mouse operation in the application design area, for example, dragging in order to connect the selected development parts by a connection line. As a result, a flow of the process of the application program to be developed is defined, and the application program is generated.

When developing the application program, the user selects necessary application, template, logic, or the like from a list of various general-purpose applications, various general-purpose templates, and various general-purpose logics in the application board A111. Thereafter, the user drags and drops the selected application, template, logic, or the like to the application design area by mouse operation. Accordingly, the user can develop the application program using the selected application, template, logic, and so on.

The applications, templates, and logics registered in the list may be either pay or free. In this case, when the user uses a pay application, a pay template, or a pay logic, a charging process is performed by the charging device A119 which will be described later.

An access authority is set to various information used in the application board A111 (for example, input/output data, information representing contents displayed on the display device, application programs to be developed, information representing contents of comments exchanged between developers in co-development, and information representing a status of the development) so that only accounts belonging to a predetermined specific tenant or a predetermined specific site can access.

In this way, since the Co-innovation space is a technology capable of sharing various information between users while managing the access authority, the Co-innovation space can provide an environment for co-creating an application program safely while preventing information leakage.

The communication tool A112 provides a chat function, a video communication function, a voice communication function, a screen sharing function, and community functions such as a message board and a social network service (SNS), which are used by users. For example, the chat function can transmit and receive not only text data (for example, source code), image data, and an executable file of program, but also a part or all of application programs to be developed with setting information such as parameter values to share them.

For example, the user selects an area representing a part of the application program by surrounding the area by mouse operation, and drags and drops the selected area by mouse operation to paste the selected area on a chat screen. Thereby, the application program can be shared with other users. For example, when a graph created by data updated in real time is pasted on the chat screen, the graph displayed on the chat screen is also updated in real time. Further, a graph displayed on the chat screen of the Co-innovation space browsed by other users is also updated in real time.

In this way, since the application development environment and the communication tool collaborate seamlessly in the Co-innovation space, it is possible to easily and flexibly communicate in order to co-create applications among users.

The community is a function capable of communicating between users in real time or non-real time. For example, the community is a function such as a message board, a comment list, SNS, or the like. An access from each user to the community is limited within a range based on an access authority set in accordance with a management policy set for each tenant. Search refinement of various refining conditions (for example, task, area, business, and keyword) may be performed with respect to topics written by a user using the community function.

In this way, the user can exchange opinions with a user having an account belonging to the same tenant or the same site, or a user having an account belonging to a different tenant or a different site by using the communication tool A112. This enables users to co-create application programs.

The library A113 provides a generic process logic, a generic template, a generic analysis tool, and a historian (a database storing historical information and result information) which are used for developing or executing an application program in the application board A111.

For example, the library A113 stores various analysis tools such as a similar waveform search tool, a regression analysis tool, a multiple regression analysis tool, an MT method analysis tool, an error variance analysis tool, a data driven modeling tool, a deep learning tool, and a correlation analysis tool. The user can perform various analyses by dragging and dropping an arbitrary analysis tool to the application design area and inputting data.

The storage A114 distinguishes various kinds of information (for example, developed application programs and analysis result data) between information for public disclosure, information for tenant share, information for site share, and information for personal account. The storage A114 stores them respectively in a storage area for public disclosure, a storage area for tenant share, a storage area for site share, and a storage area for personal account. A storage area in which a user can store various kinds of information may be controlled based on the authority set in advance for each user by an administrator of a tenant.

The storage A114 may be a storage medium such as a hard disk drive (HDD), a flash memory, an EEPROM, a RAM (readable and writable memory), a ROM (Read Only Memory), or an arbitrary combination of these storage mediums.

The device manager A115 manages information on sensors, actuators, and systems included in the device nodes A13-14 accommodated by the intelligence node A11. For example, the device manager A115 manages information used for accommodating the device node A13-14, in which identification information given to the device node A13-14 and identification information on account, site, and tenant are associated with each other.

The device manager A115 of the intelligence node A11 may obtain, via the spinal node A12, information on sensors, actuators, and systems included in the device nodes A13-14 accommodated by the spinal node A12, and may manage the obtained information. Alternatively, the spiral node A12 may manage the information, and the device manager A115 of the intelligence node A11 may obtain the information from the spinal node A12.

The tenant manager A116 manages various kinds of information on tenants (companies). For example, the tenant manager A116 sets, changes, and deletes information such as tenant basic information, charge information, operation authority, approval authority, and so on. For example, the tenant manager A116 manages, for each tenant, contract information on contracts of usage of the Co-innovation space and usage of pay or free applications, tools, templates, data, and so on.

The site/account manager A117 manages various kinds of information on site (organization) and account (user). For example, the site/account manager A117 sets, changes, and deletes information such as basic information on site and account, charging information, operation authority, approval authority, and so on.

The application store A118 is a function for allowing a user to purchase and sell a part or all of application programs, logics, templates, and data (hereinafter, called simply as application etc.). For example, when developing an application program, on the Co-innovation space screen, the user selects an application etc. which the user wishes to purchase from a list of applications etc. sold by the application store A118. Then, the user drags and drops the selected application etc. into the application design area by mouse operation. As a result, the user can purchase the selected application etc. and use it for developing an application program.

For example, the application etc. sold by the application store A118 may be charged in accordance with an arbitrary charging method such as monthly charge, annual charge, charge according to usage, or one-time charge. A specific application etc. among the applications etc. sold by the application store A118 may not be charged as a free trial period for a predetermined period (for example, one month) from when the user starts using.

The charging device A119 performs a charging process for a user who has purchased an application etc. sold by the application store A118. The charging device A119 may perform a charging process for usage of the Co-innovation space. The charge destination may be registered in advance for each tenant, site, or account.

If an application etc. which has been purchased is an application etc. which has been registered in the application store A118 by a user, a part of money collected by charging the user who has purchased the application etc. may be paid for the user who has registered the application etc.

(Example of Display by Application Board)

Hereinafter, an example of a screen (Co-innovation space screen) displayed on the display device of the application board A111 will be described.

Figure 10:
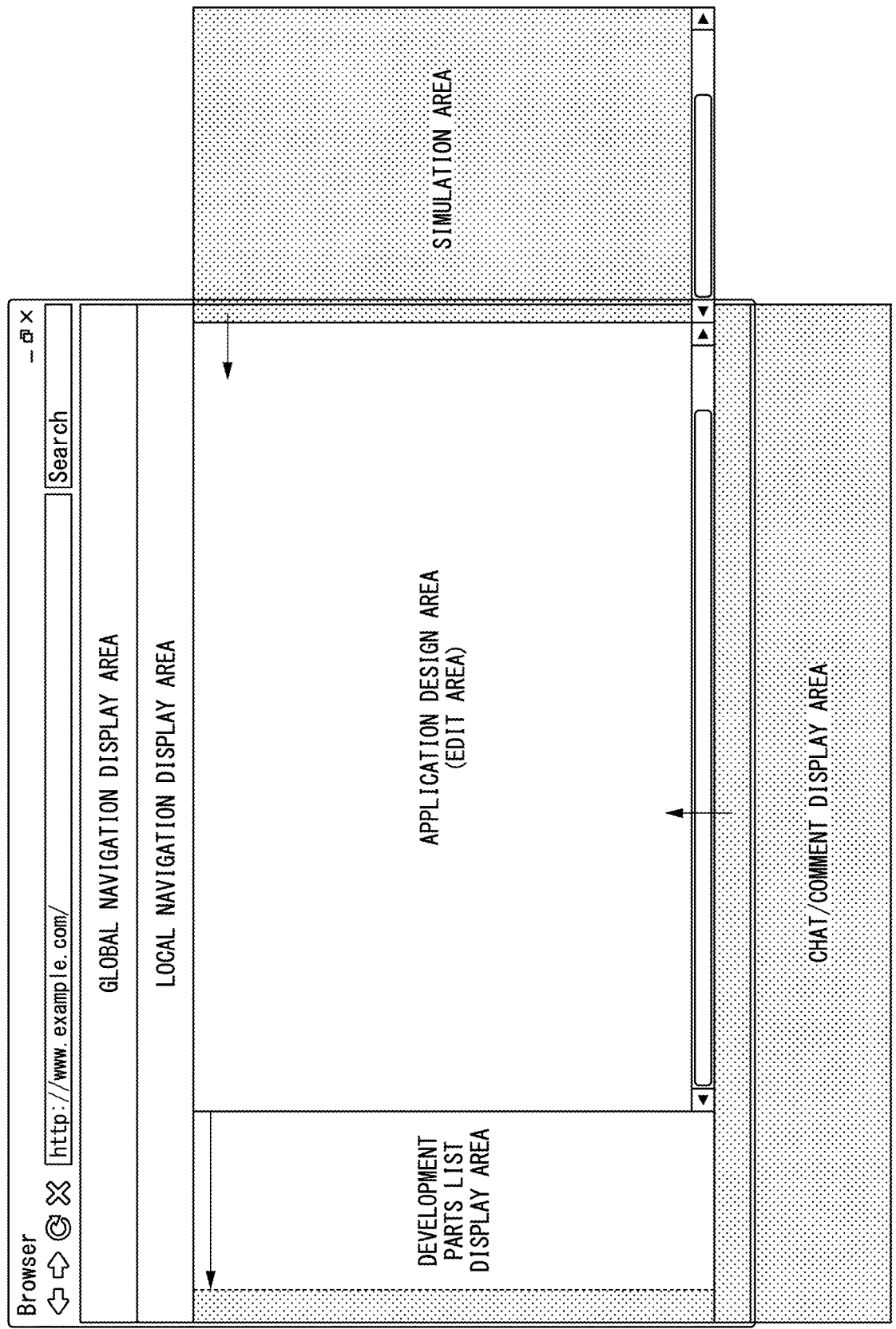
FIG. 10 is a drawing illustrating an example of a screen configuration of the Co-innovation space screen in the cloud computing environment including the resource allocation system 1 according to one or more embodiments of the present invention.

FIG. 10 is a drawing illustrating an example of a screen configuration of the Co-innovation space screen in the cloud computing environment including the resource allocation system 1 according to one or more embodiments of the present invention. As shown in the drawing, the Co-innovation space screen includes four screen areas of an application design area (edit area), a global navigation display area, a local navigation display area, and a development parts list display area.

In accordance with user operation, the development parts list display area is switched from a displayed state to a non-display state by sliding leftward to move to the outside of the screen. Thereby, since the application design area becomes wider, the user can easily edit application programs.

In accordance with user operation, the simulation area and the chat/comment display area, which are not displayed when the Co-innovation space screen is started, are switched to a displayed state. As shown in the drawing, the simulation area is switched from a non-display state to a displayed state by sliding from the right side of the screen to move into the screen. The chat/comment display area is switched from a non-display state to a displayed state by sliding from the downside of the screen to move into the screen.

Thereby, the user can make the simulation area and the chat/comment display area displayed on the display device only when they are necessary, and the user can make these screen areas not displayed when they are not necessary. For this reason, the application design area can become wider, and the user can easily edit the application program.

The application design area is a screen area for visually displaying a structure of the application program to be developed.

For example, the user selects a necessary development part from a list of development parts displayed in the development parts list display area, such as various analysis elements, various data items of input/output data, logics as process contents, various applications, various templates, various logics, various graphs, and various analysis tools, and so on. Thereafter, if the user drags and drops the selected development part into the application design area by mouse operation, an image of the selected development part can be displayed in the application design area.

For example, if the user drags between two development parts displayed in the application design area by mouse operation, a connection line connecting the two development parts can be displayed in the application design area. By performing such an operation, the user can visually design and edit an application program to be developed.

For example, the user surrounds a part of an application program to be developed, which has been visually displayed in the application design area, by mouse operation in order to select the part of the application program to be developed. Then, for example, the user drags and drops the selected part of the application program by mouse operation to paste the selected part of the application program on a chat screen. Thereby, the application program can be shared with other users.

For example, the user selects a necessary development part from a list of a part or all of application programs, logics, templates, data, and so on, which are displayed in the application store in the global navigation display area. Thereafter, if the user drags and drops the development part to the application design area by mouse operation, the development part can be displayed in the application design area. As a result, the user can purchase a necessary development part from the application store and can use it immediately.

For example, the user selects a part or all of application programs to be developed, which has been visually displayed in the application design area, by mouse operation. Thereafter, the user drags and drops the selected area into the application store displayed in the global navigation display area by mouse operation. As a result, a part or all of application programs which has been selected is registered in the application store, and information (for example, an icon image) representing a part or all of application programs which has been selected is displayed in the application store. In this way, for example, the user can sell a part or all of the developed application programs to other users in the application store.

The global navigation display area is a screen area in which a common menu screen is displayed in a tenant (company) or site (organization). For example, menus for utilizing functions such as login/logout, account setting, project switching, search, application store, and so on are displayed in the global navigation display area.

The local navigation display area is a screen area on which a menu screen corresponding to an account (user) is displayed. For example, menus for utilizing functions such as problem management, task management, version management, and project setting in an application program to be developed are displayed in the local navigation display area.

The development parts list display area is a screen area on which a list screen of development parts used for developing application programs is displayed. For example, in the development parts list display area, various analysis elements, various input/output data items, various general-purpose applications, various general-purpose templates, various general-purpose logics, various analysis tools (for example, a similar waveform search tool, a regression analysis tool, a multiple regression analysis tool, an MT method analysis tool, an error variance analysis tool, a data driven modeling tool, a deep learning tool, and a correlation analysis tool) are categorized and displayed.

The simulation area is a screen area for displaying setting information for simulating an application program displayed in the application design area, information representing simulation results, and so on.

The chat/comment display area is a screen area for displaying a chat screen which is a function for allowing a user to exchange messages with other users in real time or non-real time with respect to an application program to be developed, and for displaying a list of comments recorded in the past by the user or other users. Messages and comments displayed in the chat/comment display area are selected by the user's mouse operation. The selected message or comment is transcribed to an arbitrary position in the application design area by dragging and dropping to the application design area.

Hereinafter, an application store screen displayed on the display device of the application board A111 will be described.

Figure 11:
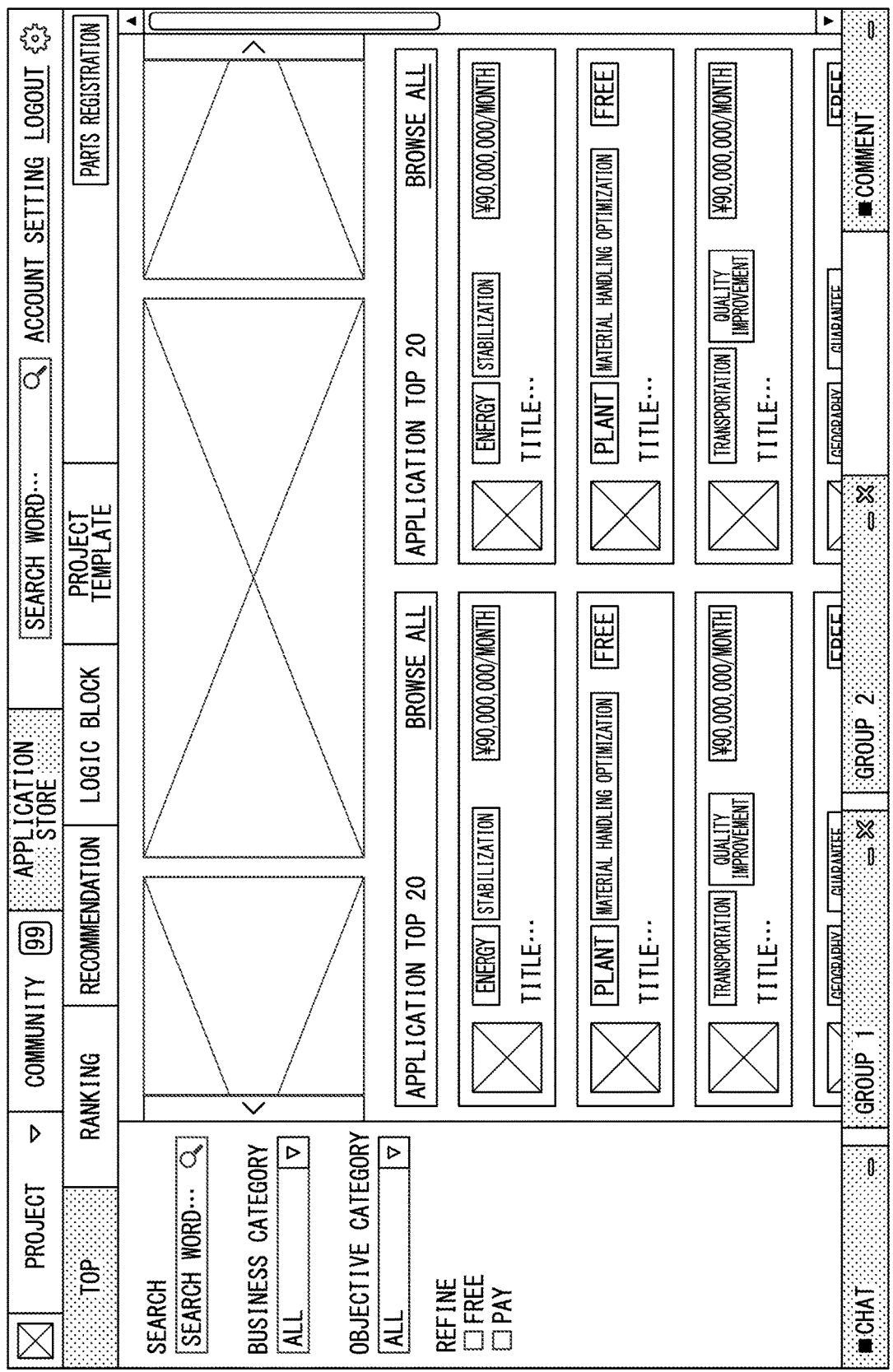
FIG. 11 is a drawing illustrating an example of an application store screen of the application board in a cloud computing environment including the resource allocation system 1 according to one or more embodiments of the present invention.

FIG. 11 is a drawing illustrating an example of an application store screen of the application board in a cloud computing environment including the resource allocation system 1 according to one or more embodiments of the present invention.

The application store screen is displayed when a display area of "application store" displayed in the menu displayed in the global navigation area is clicked by mouse operation.

In the application store, a part or all of application programs, logics, templates, data, and so on are sold and purchased.

As shown in FIG. 11, in the application store, the top 20 of applications and templates are displayed in descending order of purchased number. In an example shown in FIG. 11, in the area on the left side of the application store, a screen area for the user to search a part or all of application programs, logics, templates, data, and so on, which are registered in the application store is displayed. In the screen area, the user can perform a keyword search, a business category search for refining based on a business category targeted by the registered application, a purpose category search for refining based on a purpose of a process performed by the registered application, and a refining search for refining based on pay or free.

As described above, the user can register, in the application store, application programs, logics, and templates been developed in the Co-innovation space, and sell them to other users.

In this way, the Co-innovation space includes the application store together with the application development environment. Since the application development environment and the application store collaborate with each other, a user can easily sell developed applications to other users, and can easily purchase applications developed by other users or external vendors.

When implementing the resource allocation system 1 in one or more embodiments of the present invention in the cloud computing environment A1 described above, for example, the provider A of the resource allocation service manages the Co-innovation space.

Then, a plurality of acceptors B uploads the acceptance application information to the application store A118 in the Co-innovation space. As a result, an acceptance of computing resources provided by each acceptor B is registered, and information representing virtualized computing resources is displayed on the application store A118 based on the computing resources provided by each acceptor B.

On the other hand, the user of the acceptor C selects information representing a virtualized computing resource displayed on the application store A118, and uploads usage application information to the application store A118. As a result, a usage for the user C to use the computing resources of the acceptor B is registered, the computing resources are allocated and scheduled, and execution reservation information is generated. The generated execution reservation information is registered in the agent 201 of the acceptor server 20 of the allocated acceptor B.

In this way, since the resource allocation system 1 in one or more embodiments of the present invention is implemented in the cloud computing environment A1, the acceptor B and the user C can easily use the resource allocation service, and the service provider A can easily provide the resource allocation service.

Further, since the application store A118 is implemented, the acceptor B can easily collect from the user C compensation for providing the computing resources to the user C. On the other hand, the user C can easily pay to the user B the usage fee for using the computing resources of the user B.

As described above, the information processing device 10 in one or more embodiments of the present invention includes the storage device 100 which stores the acceptance registration information representing computing resources respectively accepted to be used by the acceptor servers 20, the usage registration information representing a usage registration for executing a task transmitted from the user server by using the accepted computing resources, and the execution reservation information representing an execution reservation of the computing resources which executes individual tasks generated by dividing the task.

The information processing device 10 includes the necessary resource calculator 104 which calculates a necessary resource representing computing resources required for executing the task. The information processing device 10 includes the provisioner 105 which determines computing resources which are to execute the individual tasks respectively based on a necessary resource, and generates the execution reservation information based on the determined computing resources. The information processing device 10 includes the allocator 106 which controls the acceptor servers 20 which have respectively accepted computing resources based on the execution reservation information to perform an execution reservation of individual tasks in the computing resources.

As described above, the information processing device 10 in one or more embodiments of the present invention includes a task obtainer 111 which obtains a task from the user server 30, the encryptor 112 which encrypts the task, the task divider 113 which divides the encrypted task into a plurality of encrypted tasks, and an individual task transmitter 114 which transmits the encrypted individual tasks respectively to the acceptor servers 20 to which an execution reservation has been performed.

The encryptor 112 encrypts the task by using an encryption (for example, a fully homomorphic encryption, or a limited fully homomorphic encryption) which can be used for dividing a calculation amount while maintaining privacy and calculating each of them.

The information processing device 10 includes the individual execution result obtainer 115 which obtains, from acceptor servers 20, individual execution results representing execution results of the encrypted individual tasks executed respectively by the computing resources accepted by the acceptor servers 20, the individual execution result combiner 116 which combines the individual execution results obtained from the acceptor servers 20 respectively to generate an execution result in which the task has been encrypted, a decryptor 117 which decrypts the execution result in which the task has been encrypted, and the execution result transmitter 118 which transmits the decrypted execution result to the user server 30.

Thereby, the information processing device, the resource allocation system, and the resource allocation method in one or more embodiments of the present invention can perform secure distributed computing using acceptor's computing resources without disclosing analysis information to the acceptor.

In the conventional system such as the distributed processing system described in Patent Document 1, analysis information such as data and programs used for analyzing big data is disclosed to the acceptor B. Therefore, it is difficult for the user C to provide the analysis information unless the acceptor B is trustworthy. On the other hand, in the information processing device 10 in one or more embodiments of the present invention, the analysis information is not disclosed. Therefore, the user C can use the computing resources of the acceptor B regardless of the trustworthiness of the acceptor B.

A part or whole of the information processing device 10 in one or more embodiments may be implemented by a computer. In this case, a program for implementing the control function may be stored in a computer-readable storage medium, a computer system may read the program stored in the storage medium, and the program may be executed.

The "computer system" is a computer system in the information processing device 10, and may include hardware, such as an OS and a peripheral device. The "computer readable storage medium" is a storage device, such as a flexible disk, a magneto-optical disk, a ROM, and a CD-ROM, and a hard disk drive built in the computer system.

Further, the "computer readable storage medium" may include a medium which dynamically holds a program for a short period of time in a case that the program is transmitted via a network such as the Internet or a communication line such as a telephone line, and a memory which holds a program for a certain period of time, such as a volatile memory in the computer system as a server or a client in that case. Further, the program may be for implementing a part of the above-described functions, or may be for implementing the above-described functions together with a program already stored in the computer system.

A part or whole of the information processing device 10 in one or more embodiments may be implemented as an integrated circuit such as LSI (Large Scale Integration). Each of functional blocks of the information processing device 10 may be individually implemented as a processor, or a part or whole of them may be integrated into a processor. A method of forming an integrated circuit is not limited to LSI, and it may be implemented by a dedicated circuit or a general-purpose processor. If an integrated circuit technology to replace the LSI is obtained due to advances in semiconductor technology, an integrated circuit based on the technology may be used.

As used herein, the following directional terms "front, back, above, downward, right, left, vertical, horizontal, below, transverse, row and column" as well as any other similar directional terms refer to those instructions of a device equipped with one or more embodiments of the present invention. Accordingly, these terms, as utilized to describe one or more embodiments of the present invention should be interpreted relative to a device equipped with one or more embodiments of the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of one or more embodiments of the present invention.

The term "unit" is used to describe a component, unit or part of a hardware and/or software that is constructed and/or programmed to carry out the desired function. Typical examples of the hardware may include, but are not limited to, a device and a circuit.

Although the disclosure has been described with respect to only a limited number of embodiments, those skill in the art, having benefit of this disclosure, will appreciate that various other embodiments may be devised without departing from the scope of the present invention. Accordingly, the scope of the invention should be limited only by the attached claims.

REFERENCE SIGNS LIST

1 Resource allocation system
10 Information processing device
20 Acceptor server
21 Acceptance application terminal
30 User server
31 Usage application terminal
50 Communication network
100 Storage device
101 Acceptance application receiver
102 Accepted amount adjuster
103 Usage application receiver
104 Necessary resource calculator
105 Provisioner
106 Allocator
110 Data processor
111 Task obtainer
112 Encryptor
113 Task divider
114 Individual task transmitter
115 Individual execution result obtainer
116 Individual execution result combiner
117 Decryptor
118 Execution result transmitter
201 Agent
202 Individual task obtainer
203 Individual task executer
204 Individual execution result transmitter
205 Virtual server
211 Display device
212 Input device
213 Transceiver
301 Task storage device
302 Task transmitter
303 Execution result obtainer
311 Display device
312 Input device
313 Transceiver

The invention claimed is:

1. An information processing device comprising:
a storage that stores execution reservation information transmitted from a user server, wherein the execution reservation information represents an execution reservation of acceptor servers that execute first tasks that have been encrypted and divided; and
a processor that:
receives a second task from the user server,
encrypts and divides the second task to generate the first tasks,
requests the acceptor servers to execute the generated first tasks based on the execution reservation information stored in the storage,
receives first execution results from the acceptor servers,
decrypts and combines the first execution results to generate a second execution result, and
transmits the generated second execution result to the user server.

2. The information processing device according to claim 1,
wherein the processor further:
obtains the second task from the user server;
encrypts the second task;
divides the encrypted second task into the first tasks;
transmits the first tasks to the acceptor servers respectively;
obtains the first execution results from the acceptor servers respectively, each of the first execution results represents a result of the first task executed by each of the acceptor servers;

combines the first execution results obtained from the acceptor servers respectively to generate the second execution result in which the second task has been encrypted;
decrypts the second execution result in which the second task has been encrypted; and
transmits the decrypted second execution result to the user server.

3. The information processing device according to claim 2,
wherein the processor further encrypts the second task using an encryption method where the first tasks obtained by dividing the encrypted second task are calculated while maintaining the encrypted state.

4. The information processing device according to claim 3,
wherein the encryption method is a fully homomorphic encryption or a limited fully homomorphic encryption.

5. The information processing device according to claim 1, wherein the processor further:
obtains acceptance application information including information that represents an accepted amount of computing resources provided by the acceptor server;
obtains usage application information including information that represents a desired usage amount of the computer resources requested when executing the second task; and
generates the execution reservation information based on the acceptance application information and the usage application information, and stores the execution reservation information in the storage.

6. The information processing device according to claim 5, wherein the processor further:
calculates necessary resources that represent computing resources required for executing the second task based on the obtained usage application information; and
determines computing resources for executing each of the first tasks based on the calculated necessary resources, and generates the execution reservation information based on the determined computing resources.

7. The information processing device according to claim 5, wherein
the processor further adjusts the accepted amount based on the obtained acceptance application information, and
the storage stores acceptance registration information representing the accepted amount adjusted by the processor.

8. A resource allocation system comprising:
an information processing device;
a plurality of acceptor servers; and
a user server,
wherein the information processing device comprises:
a storage that stores execution reservation information transmitted from the user server, the execution reservation information represents an execution reservation of acceptor servers that execute first tasks that have been encrypted and divided; and
a processor that:
receives a second task from the user server,
encrypts and divides the second task to generate the first tasks,
requests the acceptor servers to execute the generated first tasks based on the execution reservation information stored in the storage,
receives first execution results from the acceptor servers,
decrypts and combines the first execution results to generate a second execution result, and
transmits the generated second execution result to the user server,
wherein at least one of the acceptor servers comprises a processor that:
executes the first task requested from the processor of the information processing device; and
transmits the first execution result of the first task to the processor of the information processing device, and
wherein the user server comprises a processor that:
transmits the second task to the processor of the information processing device; and
obtains the second execution result.

9. The resource allocation system according to claim 8,
wherein the processor of the information processing device further:
obtains the second task from the user server;
encrypts the second task;
divides the encrypted second task into the first tasks;
transmits the first tasks to the acceptor servers respectively;
obtains the first execution results from the acceptor servers respectively, each of the first execution results represents a result of the first task executed by each of the acceptor servers;
combines the first execution results obtained from the acceptor servers respectively to generate the second execution result in which the second task has been encrypted;
decrypts the second execution result in which the second task has been encrypted; and
transmits the decrypted second execution result to the user server.

10. The resource allocation system according to claim 9,
wherein the processor of the information processing device further encrypts the second task using an encryption method where the first tasks obtained by dividing the encrypted second task are calculated while maintaining the encrypted state.

11. The resource allocation system according to claim 10,
wherein the encryption method is a fully homomorphic encryption or a limited fully homomorphic encryption.

12. The resource allocation system according to claim 8,
wherein the processor of the information processing device further:
obtains acceptance application information including information that represents an accepted amount of computing resources provided by the acceptor server;
obtains usage application information including information that represents a desired usage amount of the computer resources requested when executing the second task; and
generates the execution reservation information based on the acceptance application information and the usage application information, and stores the execution reservation information in the storage.

13. The resource allocation system according to claim 12,
wherein the processor of the information processing device further:
calculates necessary resources that represent computing resources required for executing the second task based on the obtained usage application information; and
determines computing resources for executing each of the first tasks based on the calculated necessary resources, and generates the execution reservation information based on the determined computing resources.

14. The resource allocation system according to claim 12, wherein:
- the processor of the information processing device further adjusts the accepted amount based on the obtained acceptance application information; and
- the storage stores acceptance registration information representing the accepted amount adjusted by the processor of the information processing device.

15. A resource allocation method performed by a processor of a computer, the resource allocation method comprising:
- storing, in a storage, execution reservation information transmitted from a user server, wherein the execution reservation information represents an execution reservation of acceptor servers that execute first tasks that have been encrypted and divided;
- receiving a second task from the user server;
- encrypting and dividing the second task to generate the first tasks;
- requesting the acceptor servers to execute the generated first tasks based on the execution reservation information stored in the storage;
- receiving first execution results from the acceptor servers;
- decrypting and combining the first execution results to generate a second execution result; and
- transmitting the generated second execution result to the user server.

16. The resource allocation method according to claim 15, wherein the resource allocation method further comprises:
- obtaining the second task from the user server;
- encrypting the second task;
- dividing the encrypted second task into the first tasks;
- transmitting the first tasks to the acceptor servers respectively;
- obtaining the first execution results from the acceptor servers respectively, each of the first execution results represents a result of the first task executed by each of the acceptor servers;
- combining the first execution results obtained from the acceptor servers respectively to generate the second execution result in which the second task has been encrypted;
- decrypting the second execution result in which the second task has been encrypted; and
- transmitting the decrypted second execution result to the user server.

17. The resource allocation method according to claim 16, further comprising:
- encrypting the second task using an encryption method where the first tasks obtained by dividing the encrypted second task are calculated while maintaining the encrypted state.

18. The resource allocation method according to claim 17, wherein the encryption method is a fully homomorphic encryption or a limited fully homomorphic encryption.

19. The resource allocation method according to claim 15, further comprising:
- obtaining acceptance application information including information that represents an accepted amount of computing resources provided by the acceptor server;
- obtaining usage application information including information that represents a desired usage amount of the computer resources requested when executing the second task; and
- generating the execution reservation information based on the acceptance application information and the usage application information, and storing the execution reservation information in the storage.

20. The resource allocation method according to claim 19, further comprising:
- calculating necessary resources that represent computing resources required for executing the second task based on the obtained usage application information; and
- determining computing resources for executing each of the first tasks based on the calculated necessary resources, and generating the execution reservation information based on the determined computing resources.

* * * * *